United States Patent
Holzwarth et al.

(10) Patent No.: US 7,920,770 B2
(45) Date of Patent: Apr. 5, 2011

(54) REDUCTION OF SUBSTRATE OPTICAL LEAKAGE IN INTEGRATED PHOTONIC CIRCUITS THROUGH LOCALIZED SUBSTRATE REMOVAL

(75) Inventors: Charles Holzwarth, Boston, MA (US);
Jason S. Orcutt, Somerville, MA (US);
Milos Popovic, Somerville, MA (US);
Judy L. Hoyt, Newton, MA (US);
Rajeev Ram, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 300 days.

(21) Appl. No.: 12/113,580

(22) Filed: May 1, 2008

(65) Prior Publication Data
US 2009/0274418 A1    Nov. 5, 2009

(51) Int. Cl.
*G02B 6/10* (2006.01)
*G02B 6/12* (2006.01)

(52) U.S. Cl. .......................................... 385/129; 385/14
(58) Field of Classification Search .................. None
See application file for complete search history.

(56) References Cited

U.S. PATENT DOCUMENTS

| | | | |
|---|---|---|---|
| 3,558,213 A | 1/1971 | Marcatili | |
| 4,142,775 A | 3/1979 | Ramaswamy et al. | |
| 4,679,893 A | 7/1987 | Ramer | |
| 4,781,424 A * | 11/1988 | Kawachi et al. | 385/132 |
| 4,852,117 A | 7/1989 | Po | |
| 5,371,817 A | 12/1994 | Revelli, Jr. et al. | |
| 5,418,868 A * | 5/1995 | Cohen et al. | 385/16 |
| 5,625,403 A | 4/1997 | Hazman | |
| 5,900,637 A | 5/1999 | Smith | |
| 6,025,943 A | 2/2000 | Meekers et al. | |
| 6,031,957 A * | 2/2000 | Suzuki et al. | 385/129 |
| 6,052,495 A | 4/2000 | Little et al. | |
| 6,289,151 B1 | 9/2001 | Kazarinov et al. | |
| 6,351,575 B1 * | 2/2002 | Gampp et al. | 385/14 |
| 6,442,311 B1 | 8/2002 | Barbarossa et al. | |
| 6,529,277 B1 | 3/2003 | Weitekamp | |
| 6,636,669 B1 | 10/2003 | Chin et al. | |
| 6,668,111 B2 | 12/2003 | Tapalian et al. | |
| 6,711,200 B1 | 3/2004 | Scherer et al. | |
| 6,839,482 B2 | 1/2005 | Margalit | |
| 6,847,750 B1 * | 1/2005 | Baumann et al. | 385/16 |
| 6,947,632 B2 | 9/2005 | Fischer | |
| 7,102,469 B2 | 9/2006 | Kim et al. | |
| 7,123,800 B2 | 10/2006 | Kaplan | |
| 7,145,660 B2 | 12/2006 | Margalit et al. | |
| 7,164,838 B2 | 1/2007 | Blauvelt et al. | |

(Continued)

FOREIGN PATENT DOCUMENTS

EP    0 646 832 A2    4/1995

(Continued)

OTHER PUBLICATIONS

R.L. Espinola et al. Fast and low-power thermooptic switch on thin silicon-on-insulator. IEEE Photonics Technology Letters, 15:10:1366-1368, Oct. 2003.*

(Continued)

*Primary Examiner* — Mike Stahl
(74) *Attorney, Agent, or Firm* — Goodwin Procter LLP

(57) ABSTRACT

Structures including optical waveguides disposed over substrates having a chamber or trench defined therein, and methods for formation thereof.

21 Claims, 11 Drawing Sheets

U.S. PATENT DOCUMENTS

| | | | |
|---|---|---|---|
| 7,215,848 | B2 | 5/2007 | Tan et al. |
| 7,292,751 | B2 | 11/2007 | Popovic |
| 7,339,724 | B2 | 3/2008 | Hochberg et al. |
| 7,539,375 | B2 | 5/2009 | Popovic |
| 7,583,874 | B2 | 9/2009 | Rakich et al. |
| 2001/0040681 | A1 | 11/2001 | Paiam et al. |
| 2001/0046344 | A1 | 11/2001 | Hayashi et al. |
| 2002/0076188 | A1 | 6/2002 | Kimerling et al. |
| 2002/0122648 | A1 | 9/2002 | Mule' et al. |
| 2002/0136481 | A1 | 9/2002 | Mule' et al. |
| 2002/0172466 | A1 | 11/2002 | Baumann et al. |
| 2003/0015770 | A1 | 1/2003 | Talin et al. |
| 2003/0128922 | A1 | 7/2003 | Kolodziejski et al. |
| 2003/0156780 | A1 | 8/2003 | Margalit et al. |
| 2003/0210860 | A1 | 11/2003 | Margalit |
| 2003/0219052 | A1 | 11/2003 | Goodhue et al. |
| 2004/0008942 | A1 | 1/2004 | Scheuer et al. |
| 2004/0013355 | A1 | 1/2004 | Margalit |
| 2004/0056243 | A1 | 3/2004 | Atanackovic et al. |
| 2004/0114899 | A1 | 6/2004 | Mattsson |
| 2004/0161188 | A1 | 8/2004 | Su et al. |
| 2005/0029536 | A1* | 2/2005 | Sugitatsu et al. ............. 257/103 |
| 2005/0036737 | A1 | 2/2005 | Stuart |
| 2005/0068602 | A1 | 3/2005 | Tormen et al. |
| 2005/0077526 | A1 | 4/2005 | Shin et al. |
| 2005/0147348 | A1 | 7/2005 | Grunnet-Jepsen et al. |
| 2005/0163418 | A1 | 7/2005 | Wong et al. |
| 2005/0169566 | A1* | 8/2005 | Takahashi .......................... 385/1 |
| 2005/0259937 | A1* | 11/2005 | Whaley et al. ................. 385/132 |
| 2005/0275921 | A1 | 12/2005 | Haus et al. |
| 2006/0029325 | A1 | 2/2006 | Fardi et al. |
| 2006/0083456 | A1 | 4/2006 | Burns et al. |
| 2006/0134535 | A1 | 6/2006 | Porque |
| 2006/0239614 | A1 | 10/2006 | Montgomery et al. |
| 2006/0274995 | A1 | 12/2006 | Lee et al. |
| 2006/0291791 | A1 | 12/2006 | Hochberg et al. |
| 2007/0035800 | A1 | 2/2007 | Hochberg et al. |
| 2007/0133934 | A1 | 6/2007 | Blauvelt et al. |
| 2007/0211992 | A1 | 9/2007 | chu et al. |
| 2007/0253663 | A1* | 11/2007 | Keyser et al. .................... 385/36 |
| 2008/0002992 | A1 | 1/2008 | Hochberg et al. |
| 2008/0014534 | A1 | 1/2008 | Barwicz et al. |
| 2008/0044184 | A1 | 2/2008 | Popovic |
| 2008/0166095 | A1 | 7/2008 | Popovic et al. |
| 2009/0022445 | A1 | 1/2009 | Hochberg et al. |
| 2009/0087137 | A1* | 4/2009 | Doan .............................. 385/14 |
| 2009/0142019 | A1 | 6/2009 | Popovic |
| 2009/0220228 | A1 | 9/2009 | Popovic |
| 2009/0290835 | A1 | 11/2009 | Popovic |
| 2010/0002994 | A1 | 1/2010 | Baehr-Jones et al. |
| 2010/0158429 | A1 | 6/2010 | Popovic |

FOREIGN PATENT DOCUMENTS

| | | |
|---|---|---|
| EP | 0 909 963 A1 | 4/1999 |
| EP | 1 241 497 A2 | 9/2002 |
| EP | 1 785 771 A2 | 5/2007 |
| JP | 2001-194160 A | 7/2001 |
| WO | WO-8501123 A1 | 3/1985 |
| WO | WO-0050938 A1 | 8/2000 |
| WO | WO-0123955 A1 | 4/2001 |
| WO | WO-0155814 A2 | 8/2001 |
| WO | WO-01/88580 A1 | 11/2001 |
| WO | WO-0217004 | 2/2002 |
| WO | WO-02/063389 A1 | 8/2002 |
| WO | WO-02/101421 A2 | 12/2002 |
| WO | WO-03/036841 A1 | 5/2003 |
| WO | WO-03/043247 A2 | 5/2003 |
| WO | WO-2005/010618 A2 | 2/2005 |
| WO | WO-2005/104147 A2 | 11/2005 |
| WO | WO-2006/025760 A2 | 3/2006 |
| WO | WO-2006/076585 A2 | 7/2006 |

OTHER PUBLICATIONS

Kelly et al., "Monolithic Suspended Optical Waveguides for InP MEMS," 16 IEEE Photonics Tech. Lett. 5, pp. 1298-1300 (2004).
Kelly et al., "Monolithic Suspended Optical Waveguides for InP MEMS," 16 IEEE Photonics Tech. Lett. 5, pp. 1298-1300 (2004).
Altug et al., "Ultrafast Photonic Crystal Nanocavity Laser," Nature Physics 2 (2006) pp. 484-488.
Badolato et al., "Deterministic Coupling of Single Quantum Dots to Single Nanocavity Modes," Science 308 (2005) pp. 1158-1161.
Baehr-Jones et al., "High-Q Ring Resonators in Thin Silicon-on-Insulator," 85 Appl. Phys. Lett. 16 (Oct. 2004) pp. 3346-3347.
Barwicz, "3D analysis of scattering losses due to sidewall roughness in microphotonic waveguides: high index-contrast," 2005 Conf. on Lasers and Electro-Optics (CLEO), vol. 2, pp. 1333-1335.
Becker et al., "Optical Properties of Semiconductors. III. Infra-red Transmission of Silicon," 76 Physical Rev. A, pp. 1531-1532 (1949).
Bogaerts et al., "Low-loss, low-cross-talk crossings for silicon-on-insulator nanophotonic waveguides," 32 Optics Letters 19, pp. 2801-2803, (2007).
Bozhevolnyi et al., "Channel Plasmon Subwavelength Waveguide Components Including Interferometers and Ring Resonators," Nature 440 (2006) pp. 508-511.
Bustillo et al., "Surface Micromachining for Microelectromechanical Systems," Proc. of the IEEE 86 (1998) pp. 1552-1574.
Chan et al., "Single-mode and Polarization-independent Silicon-on-insulator waveguides with Small Cross Section," 23 J. Lightwave Tech. 6 (Jun. 2005) pp. 2103-2111.
Chen et al., "Low-loss multimode-interference-based crossings for Silicon Wire Waveguides," 18 IEEE Photonics Letters 21, pp. 2260-2262 (2006).
Chuang, S.L., Physics of Optoelectronic Devices, (Wiley, NY, 1995).
Daldosso et al., "Fabrication and Optical Characterization of thin two-dimensional Si3N4 Waveguides," Mat. Sci. in Semicond. Proc. 7, (2004) pp. 453-458.
Daldosso et al., "Comparison Among Various Si3N4 Waveguide Geometries Grown within a CMOS Fabrication Pilot Line," 22 J. Lightwave Tech. 7 (Jul. 2004) pp. 1734-1740.
Dumon et al., "Low-loss photonic wires and compact ring resonators in silicon-on-insulator," 5450 Proc. SPIE 1, pp. 360-368 (2004).
Eichenfield et al., "Actuation of Micro-optomechanical Systems via Cavity-enhanced Optical Dipole Forces," 1 Nature Photonics 7, pp. 416-422 (2007).
Examination Report in European Patent Application No. 04786154.7, mailed Jul. 16, 2008.
Guo et al., "Characterization of Si3N4/SiO2 Planar Lightwave Circuits and Ring Resonators," Proc. of SPIE, vol. 5350 (2004) pp. 13-22.
Guo et al., "High-Q Microring Resonator for Biochemical Sensors," 5728 Proc. SPIE, pp. 83-92 (2005).
Gritsenko et al., "Short-range order in non-stoichiometric amorphous silicon oxynitride and silicon-rich nitride," 297 J. Non-Crystalline Solids 1, pp. 96-101 (Jan. 2002).
Haus, H.A. Waves and Fields in Optoelectronics, (Prentice-Hall, Englewood Cliffs, NJ, 1984).
In et al., "Origami Fabrication of Nanostructured, Three-dimensional Devices: Electrochemical Capacitors with Carbon Electrodes," Appl. Phys. Lett. 88 (2006) 83104.
International Preliminary Report on Patentability and Written Opinion for PCT/US06/028848, mailed Feb. 7, 2008.
International Search Report & Written Opinion for PCT/US2007/026513, mailed Jun. 19, 2008.
International Search Report & Written Opinion for PCT/US2008/082054, dated Mar. 18, 2009.
International Search Report & Written Opinion for PCT/US2009/041668, mailed Sep. 11, 2009 (14 pages).
International Search Report & Written Opinion for PCT/US2005/043762, mailed Jun. 19, 2008, 8 pages.
International Search Report & Written Opinion for PCT/US2007/015740, dated Feb. 18, 2008 (10 pages).
International Search Report for PCT/US06/28848, mailed Feb. 16, 2007.
Jackson, J.D., Classical Electrodynamics (Wiley, NY, 1999).
Johnson et al., "Perturbation Theory for Maxwell's Equations with Shifting Boundaries," Phys. Rev. E, 65, 066611 (2002).
Kippenberg et al., "Analysis of Radiation-pressure Induced Mechanical Oscillation of an Optical Microcavity," Phys. Rev. Lett. 95 (2005) 033901.

Kogelnik et al., "Switched Directional Couplers with Alternating Δβ," 12 IEEE J. Quantum Elec. 7, pp. 396-401 (1976).

Korotky, "Three-Space Representation of Phase-Mismatch Switching in Coupled Two-State Optical System," 22 IEEE J. Quantum Elec. 6, pp. 952-258 (1986).

Little et al., "Very High-order Microring Resonator Filters for WDM Applications," 16 IEEE Photonics Tech. Lett 10 (Oct. 2004) pp. 2263-2265.

Liu et al., "Low-loss waveguide crossing using a multimode interference structure," 241 Optics Communications 1-3, pp. 99-104 (2004).

Maboudian et al., "Critical Review: Adhesion in Surface Micromechanical Structures," J. Vac. Sci. Tech. B, 15 (1997).

Madsen et al., Optical Filter Design and Analysis: A Signal Processing Approach, (Wiley, NY, 1999).

Madsen et al., "A Multi-Port Add/Drop Router using UV-induced Gratings in Planar Waveguides", pp. 104-106, OFC 1999 (ThH3).

Melchiorri et al., "Propogation Losses of Silicon Nitride Waveguides in the Near Infrared Range," Appl. Phys. Lett. 86, 121111 (2005).

Mizrahi et al., "Two Slab Optical Spring," Optics Lett. 32 (2007) pp. 692-694.

Mizrahi et al., "Mirror Manipulation by Attractive and Repulsive Forces of Guided Waves," Opt. Express 13 (2005) pp. 9804-9811.

Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.

Nichols et al., "A Preliminary Communication on the Pressure of Heat and Light Radiation," Phys. Rev. 13 (1901) pp. 307-320.

Nielson et al., "Integrated Wavelength-selective Optical MEMS Switching using Ring Resonator Filters," IEEE Photonics Tech. Lett. 17 (2005) pp. 1190-1192.

Nielson, G.N., "Micro-opto-mechanical Switching and Tuning for Integrated Optical Systems," Ph.D. Thesis, Massachusetts Institute of Technology (2004).

Notomi et al., "Optomechanical Wavelength and Energy Conversion in High-Q Double-layer Cavities of Photonic Crystal Slabs," Phys. Rev. Lett. 97 (2006) 023903.

Oda et al., "A Wide-FSR Waveguide Double-Ring Resonator for Optical FDM Transmission Systems," 9 J. Lightwave Tech. 6, pp. 728-736 (1991).

Okamoto, K., Fundamentals of Optical Waveguides, (Elsevier Academic Press, MA, 2006).

Partial International Search Report for International Application No. PCT/US2008/080749, mailed Mar. 24, 2009.

Philipp et al., "Amorphous Silicon Rich Silicon Nitride Optical Waveguides for High Density Integrated Optics," 40 IEEE Electronics Letters 7, pp. 419-420. (Apr. 2004).

Popovic et al., "Multistage High-Order Microring-Resonator add-drop Filters," 31 Optics Lett. 17 (Sep. 2006) pp. 2571-2573.

Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.

Popovic, M., "Complex-frequency Leaky Mode Computations using PML Boundary Layers for Dielectric Resonant Structures," Proc. of Integ. Photonics Res. (Jun. 2003).

Popovic et al., "General Approach to Hitless Switching and FSR Extension Resonators in Integrated Photonic Circuits," (2006) Paper OW166.

Popovic, "Air Trenches for Dense Silica Integrated Optics," MS Thesis, Massachusetts Institute of Technology, Dept. of Electrical Engineering & Computer Science, Feb. 2002, p. 53.

Popovic, "Theory and Design of High-Index-Contrast Microphotonic Circuits," Ph.D. Thesis, Massachusetts Institute of Technology, Dept. of Electrical Engineering & Computer Science, Feb. 2008.

Povinelli et al., "Evanescent-wave Bonding Between Optical Waveguides," (2005)pp. 3042-3044, Optics Lett. 30.

Povinelli et al., "High-Q Enhancement of Attractive and Repulsive Optical Forces between Coupled Whispering-gallery-mode Resonators," Opt. Express 13 (2005) pp. 8286-8295.

Povinelli et al., "Enhancement mechanisms for optical forces in integrated optics," 6326 Proc. of SPIE Optical Trapping & Optical Manip. III 15, (2006).

Qi et al., "A Three-dimensional Optical Photonic Crystal with Designed Point Defects," Nature 429 (2004) pp. 538-542.

Rakich et al., "Trapping, corraling and spectral bonding of optical resonances through optically induced potentials," 1 Nature Photonics 11, pp. 658-665 (2007).

Rakich et al., "Ultrawide Tuning of Photonic Microcavities via Evanescent Field Perturbation," Optics Lett. 31 (2006) pp. 1241-1243.

Rakich et al., "Cavity-Trapping via Optical-forces in Integrated Photonics," Massachusetts Institute of Technology.

Rakich et al., "Achieving Centimeter-scale supercollimation in a Large-area Two-dimensional Photonic Crystal," Nature Materials 5 (2006) pp. 93-96.

Sarid, D., Scanning Force Microscopy with Applications to Electric, Magnetic, and Atomic Forces, (Oxford University Press, NY, 1994).

Saynatjoki et al., "High-index-contrast Optical Waveguides on Silicon," 2 pages, ICPS-27 (2005).

Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (1998).

Song et al., "Ultra-high-Q Photonic Double-heterostructure Nanocavity," Nature Materials 4 (2005) pp. 207-210.

Spector et al., "Hybrid multi-mode/single-mode Waveguides for Low Loss," Massachusetts Institute of Technology, 3 pages, OAA/ IPR 2004 (IThE5).

Srinivasan et al., "Alkyltrichlorosilane-based Self-assembled Monolayer Films for Stiction Reduction in Silicon Micromachines," J. of Microelectromechanical Sys. 7 (1998) pp. 252-260.

Tang et al., Highly efficient optical phase modulator in SOI waveguides, 31 Electronics Letters 6, pp. 451-452 (1995).

Tormen, "Passive Optical Integrated Components for Telecommunication," Universite De Nice-Sophia Antipolis (2003) 196 pages.

Van Spengen et al., "A Physical Model to Predict Stiction in MEMS," J. of Micromechanics & Microengineering 12 (2002) pp. 702-713.

Xu et al., "Micrometre-scale silicon electro-optic modulator," Nature, vol. 435, pp. 325-327 (2005).

Yanagase et al., "Box-Like Filter Response and Expansion of FSR by a Vertically Triple Coupled Microring Resonator Filter," 20 J. Lightwave Tech. 8, pp. 1525-1529 (2002).

International Search Report and Written Opinion for PCT/US2008/080749 dated May 25, 2009 (19 pages).

International Search Report and Written Opinion for PCT/US2007/026513 dated Dec. 28, 2007 (15 pages).

International Preliminary Report on Patentability for PCT/US2007/026513 dated Jul. 9, 2009.

Barbarossa et al., "Novel Double-Ring Optical-Guided-Wave Vernier Resonator," 144 IEE Proc.-Optoelectron. 4, pp. 203-208 (Aug. 1997).

Barbarossa et al., "Theoretical Analysis of Triple-Coupler Ring-Based Optical Guided-Wave Resonator," 13 J. Lightwave Tech. 2, pp. 148-157 (Feb. 1995).

Barbarossa et al., "Triple-Coupler Ring-Based Optical Guided-Wave Resonator," 30 IEEE Electronics Lett. 2, pp. 131-133 (Jan. 20, 1994).

Barwicz et al., "Polarization-transparent microphotonic devices in the Strong Confinement Limit," Nature Photonics 1, pp. 57-60 (Jan. 2007).

Batten et al., "Building Manycore Processor-to-DRAM Networks with Monolithic CMOS Si Photonics," IEEE Micro, p. 8-21 (Jul. 2009).

Bethe, "Theory of Diffraction by Small Holes," 66 Phys. Rev. 7-8, pp. 163-182 (Oct. 1944).

Campbell et al., "GaAs Electro-Optic Directional-coupler switch," 27 Applied Physics Lett. 4, pp. 202-205 (Aug. 1975).

Chremmos et al., "Properties of Regular Polygons of Coupled Microring Resonators," 46 Applied Optics Optical Society of America 31, pp. 7730-7738 (Nov. 1, 2007).

Darmawan et al., "Nested Ring Mach-Zender Interferometer," 15 Optics Express Opt. Soc. America 2, pp. 437-448 (Jan. 2001).

Doerr et al., "Wavelength Add-Drop Node Using Silica Waveguide Integration," 22 J. Lightwave Tech. 12, pp. 2755-2762 (Dec. 2004).

Domash et al., "Tunable and Switchable Multiple-Cavity Thin Film Filters," 22 J. Lightwave Tech. 1, pp. 126-135 (Jan. 2004).
Fan et al., "Theoretical Analysis of Channel Drop Tunneling Processes," 59 Phys. Rev. B 2, pp. 15882-15892 (Jun. 15, 1999).
Findakly et al., "On the Crosstalk of Reversed-Δβ Durectional Coupler Switches," 6 J. of Lightwave Tech. 1, pp. 36-40 (Jan. 1988).
Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., Optics Express 15, 17264 (2007).
Green et al., Optics Express 15, 17106 (2007).
Gunn, "CMOS Photonics for High-Speed Interconnects," IEEE Micro 26 (2), pp. 58-66 (Mar./Apr. 2006).
Gupta et al., Conf. on Lasers and Electro-Optics (CLEO), p. paper CTuNN5 (2008).
Haus et al., "Elimination of Cross Talk in Optical Directional Couplers," 46 Applied Physics Lett. 1, pp. 1-3 (Jan. 1, 1985).
Haus et al., "Broadband Hitless Bypass Switch for Integrated Photonic Circuits," 18 IEEE Photonics Tech. Lett. 10, pp. 1137-1139 (May 15, 2006).
Holzwarth et al., "High Speed analog-to-digital conversion with silicon photonics," in Proc. SPIE 7220, 72200B (2009).
International Preliminary Report on Patentability in International Patent Application No. PCT/US2008/003957, dated Sep. 29, 2009 (11 pages). (Corresponds to U.S. Appl. No. 12/532,796).
International Search Report & Written Opinion for International Patent Application No. PCT/US2007/018207, mailed Jul. 29, 2008 (13 pages). (Corresponds to U.S. Appl. No. 11/840,028).
International Search Report & Written Opinion for PCT/US2008/003300, mailed Oct. 14, 2008. (Corresponds to U.S. Appl. No. 11/800,446).
International Search Report & Written Opinion for PCT/US2009/066537, mailed Apr. 16, 2010 (17 pages). (Corresponds to U.S. Appl. No. 12/630,322).
Khan et al., "Mode-Coupling Analysis of Multipole Symmetric Resonant Add/Drop Filters," 35 IEEE J. of Quantum Elec. 10, pp. 1451-1460 (Oct. 1999).
Khurgin et al., "Expanding the Bandwidth of Slow-Light Photonic Devices Based on Coupled Resonators," 30 Optics Lett. 5, pp. 513-515 (Mar. 1, 2005).
Lee et al., "MEMS-Actuated Microdisk Resonators with Variable Power Coupling Ratios," 17 IEEE Photonics Tech. Lett. 5, pp. 1034-1036 (May 2005).
Lee et al., "Tunable Coupling Regimes of Silicon Microdisk Resonators using MEMS Actuators," 14 Optics Express 11, pp. 4703-4712 (May 29, 2006).
Li et al., Optics Express 16, 13342 (2008).
Little et al., "Filter Synthesis for Periodically Coupled Microring Resonators," 25 Optics Lett. 5, pp. 344-346 (Mar. 1, 2000).
Little et al., "Microring Resonator Channel Dropping Filters," J. Lightwave Tech. 15, pp. 998-1005 (1997).
Little et al., "Wavelength Switching and Routing using Absorption and Resonance," 10 IEEE Photonics Tech. Lett. 6, pp. 816-818 (Jun. 1998).
Madsen, "Efficient Architectures for Exactly Realizing Optical Filters with Optimum Bandpass Designs," 10 IEEE Photonics Tech. Lett. 8, pp. 1136-1138 (Aug. 1998).
Madsen et al., "Hitless Reconfigurable Add/Drop Multiplexers using Bragg Gratings in Planar Waveguides," OSA TOPS, v. 29, WDM Components, pp. 54-60.
Manolatou et al., "High-Density Integrated Optics," 17 J. Lightwave Tech. 9, pp. 1682-1692 (Sep. 1999).

Manolatou et al., "Coupling of Modes Analysis of Resonant Channel Add-Drop Filters," 35 IEEE J. of Quantum Elec. 9, pp. 1322-1331 (Sep. 1999).
McDonald, "Electric and Magnetic Coupling through Small Apertures in Shield Walls of any Thickness," MTT-20 IEEE Trans. On Microwave Theory & Techniques 10, pp. 689-695 (Oct. 1972).
Melloni et al., "Synthesis of Direct-Coupled-Resonators Bandpass Filters for WDM Systems Lightwave Technology," 20 J. Lightwave Tech. 2, pp. 296-303 (2002).
Melloni et al., Integr. Photon. Research and Applications/Nanophotonics (IPNRA), p. paper IMC1 (2006).
Papuchon et al., "Electrically switched Optical Directional Coupler: Cobra," 27 Applied Physics Lett. 5, pp. 289-291 (Sep. 1, 1975).).
Partial International Search Report for International Application No. PCT/US2007/018207, mailed Jun. 2, 2008 (5 pages). (Corresponds to U.S. Appl. No. 11/840,028).
Partial International Search Report for International Application No. PCT/US2008/00330, mailed Jul. 30, 2008 (5 pages). (Corresponds to U.S. Appl. No. 11/800,446).
Partial International Search Report for International Application No. PCT/US2008/003957, mailed Jun. 16, 2008 (8 pages). (Corresponds to U.S. Appl. No. 12/532,796).
Poon et al., "Wavelength-selective reflector based on a circular array of coupled microring resonators," 16 IEEE Photonics Technology Letters 5, pp. 1331-1333 (May 2004).
Popovic, "Optimally efficient resonance-tuned optical modulators," in CLEO 2009, paper CTuV6 (2 pages) (May 2009).
Popovic et al., Optics Express 14, 1208 (2006).
Popovic, Resonant optical modulators beyond conventional energy-efficiency and modulation frequency limitations.
Rabiei et al., "Polymer Micro-Ring Filters and Modulators," J. Lightwave Tech. 20, 1968 (2002).
Rezzonico et al., Optics Express 16, 613 (2008).
Rhodes, "A Low-Pass Filter Prototype Network for Microwave Linear Phase Filters," MTT-18 IEEE Trans. Microwave Theory Tech. 6, pp. 290-301 (Jun. 1970).
Sacher et al., Optics Express 16, 15741 (2008).
Sugimoto et al., "Waveguide polarization-independent Optical Circulator," 11 IEEE Photon. Tech. Lett. 3, pp. 355-357 (Mar. 1999).
Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).
Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).
Watts et al., "Maximally Confined Silicon Microphotonic Modulators and Switches," IEEE Proc. of the LEOS Ann. Meet., p. paper WF1, pp. 457-458 (2008).
Weber et al., "Crosstalk and Switching Characteristics in Directional Couplers," 24 IEEE J. of Quantum Elect. 3, pp. 537-548 (Mar. 1988).
Wei et al., "Compound Ring Resonator with Double Couplers," 186 Optics Communications 4- 6, pp. 283-290 (Dec. 15, 2000).
Williamson, "Sensitivity-bandwidth product for electro-optic modulators," Optics Letters 26, 1362 (2001).
Xu et al., "Experimental Realization of an on-Chip All-Optical Analogue to Electromagnetically Induced Transparency," Phys. Rev. Lett. 96, pp. 1-4 (2006).
Yanik et al., "Stopping Light All Optically," 92 Phy. Rev. Lett. 8, pp. 1-4 (Feb. 27, 2004).
Yariv et al., "Coupled-Resonator Optical Waveguide: a Proposal and Analysis," 24 Optics Lett. 11, pp. 711-713 (Jun. 1, 1999).
Holzwarth et al. "Localized Substrate Removal Techniquie Enabling Strong-Confinement Microphotonics in Bulk Si CMOS Processes," CLEO/QELS (May 4-9, 2008).

* cited by examiner

REDUCTION OF SUBSTRATE OPTICAL LEAKAGE IN INTEGRATED PHOTONIC CIRCUITS THROUGH LOCALIZED SUBSTRATE REMOVAL

GOVERNMENT LICENSE RIGHTS

This invention was made with government support under Grant No. W911NF-06-1-0449 awarded by the Army. The government has certain rights in this invention.

FIELD OF THE INVENTION

This invention relates generally to photonic devices and specifically to the integration of photonic devices with electronic integrated circuits without high propagation loss due to optical power leakage into the substrate.

BACKGROUND

Currently, photonic devices are typically fabricated over thick [i.e., >1 micrometer (μm)] low-index undercladding layers to prevent optical power from leaking into the underlying bulk substrate. This thick low-index layer is not usually formed during conventional electronic integrated circuit (IC) process flows. It is possible to design specialized process flows to add such thick underlayers or to use specialized starting substrates such as semiconductor-on-insulator wafers (SOI) with very thick buried-oxide layers. Such solutions, however, are generally difficult to implement because of increased cost, the limited availability of such specialized substrates and process flows, and the potentially adverse effects of a thick undercladding layer on the thermal and electrical properties of the ICs.

SUMMARY

Preferably, an index of refraction of a material underlying a photonic device is significantly lower than the indices of refraction of the photonic device components, thereby improving optical confinement. A drawback of current solutions for fabricating photonic devices is the challenge in finding a substrate that has a low refractive index that reduces optical losses attributable to power leakage into the substrate from the photonic device, and is also compatible with conventional IC fabrication processes. Embodiments of the present invention locally provide areas with low refractive indices by selectively removing at least a portion of the bulk substrate disposed directly underneath a photonic device. This reduces losses due to optical leakage into the substrate, without requiring a thick undercladding layer. In addition to enabling the integration of photonic devices into electronic integrated circuits on bulk substrates, without changes to the process flow or starting substrate used to fabricate the electronic devices, embodiments of this invention also open up the possibility of higher-index contrast photonic devices since the undercladding material may now have a refractive index as low as 1.0.

In the last decade there has been considerable effort to fabricate high-index-contrast (HIC) photonic devices that can be integrated with electronic ICs. To date these HIC photonic devices have generally utilized a relatively thick low-index cladding layer to prevent the optical power from leaking into the substrate. In current electronic integrated circuit fabrication processes, this thick low-index layer does not exist near the device level. It may also be disadvantageous to add a thick low-index layer because of the detrimental effect it may have on the thermal and electrical properties of the electronic circuits.

By locally removing the substrate directly below the photonic device, as described herein, optical power leakage to the substrate is reduced. This is achieved in two ways; first the material replacing the locally removed substrate, typically air, vacuum, or dielectric material, has a much lower refractive index than the substrate, thereby increasing the optical confinement of the photonic device. Secondly, by locally removing the substrate below the photonic device, the physical distance between the substrate and the photonic device is increased, which reduces overall optical interaction between the substrate and the photonic device. Locally removing a portion of the substrate is preferred over complete removal because the substrate is necessary for the electronic devices, for heat transport, and for mechanical support. Localized substrate removal facilitates the integration of photonics with electrical integrated circuits.

In an aspect, embodiments of the invention include a structure. The structure includes a substrate having a recess defined therein. A layer may be disposed over the recess, the layer including a first cladding material and a second cladding material. The recess and a bottom surface of the layer define a chamber. A first optical waveguide may be disposed in the layer, the first optical waveguide having a first core including a first core material and a first guided mode. The first cladding material contacts the first core, the second cladding material contacts the substrate, and the first and second cladding materials are rigidly connected. The first core and at least one of the first and second cladding materials have an index contrast of greater than 10%. A majority of the first guided mode is contained in the core and in at least one of the first cladding material and the second cladding material.

One or more of the following features may be included. The first guided mode may have a first field evanescent decay length, a bottom portion of the first optical waveguide may be disposed a first distance from the bottom surface of the layer, and the first distance may be less than 5 first evanescent decay lengths.

The layer may define an access port. A cross-section of the access port may be defined by an area of intersection of the access port and the chamber. A surface area of the chamber is the sum of a surface area of the recess and an area of a portion of the bottom surface of the layer disposed over the recess minus an area of the cross-section of the access port. The area of the cross-section of the access port is smaller than the surface area of the chamber.

The chamber may include a low-index material, such as air. The chamber may be sized to contain a remaining portion of the first guided mode. No more than 10% of a power associated with the first guided mode may be lost to the substrate per centimeter length of the first optical waveguide.

The access port may be connected to or separated from an ambient atmospheric environment.

The structure may include an optical ring resonator, with the optical ring resonator including the first optical waveguide. Each cross-sectional dimension of the first optical waveguide may be less than 1.5 μm. The first guided mode may include an associated operating wavelength range having a center free-space wavelength, and each cross-sectional dimension of the first optical waveguide may be smaller than the center free-space wavelength. The surface area of the chamber may be equal to at least 5 times, and preferably 10 times, the area of the access port cross-section.

The structure may include a second optical waveguide having a second core including a second core material and a second guided mode, the second guided mode having an associated second field evanescent decay length. A bottom portion of the second optical waveguide is disposed at a second distance from the bottom surface of the layer, the second distance being smaller than 5 second evanescent decay lengths, and the first and second optical waveguides are optically coupled.

The first and second cladding material may be the same material. At least one of the first and second cladding materials may be a solid. A refractive index of the substrate may be higher than a maximum cladding refractive index of the first and second cladding materials. The first and second cladding materials may define at least a portion of a dielectric stack of an integrated circuit.

In another aspect, embodiments of the invention include a structure. The structure may include a substrate having a trench defined in a backside thereof. The trench may have a cross-section defined by (i) a trench width defined by a distance between two opposing sidewall portions of the trench, and (ii) a trench height equal to at least 5 times the trench width. A first optical waveguide may be disposed over a top surface of the substrate and may have a first core comprising a first core material, and a first guided mode. A first cladding material may be in contact with the first core, and a second cladding material may be in contact with the substrate. The first core and at least one of the first and second cladding materials may have an index contrast of greater than 10%, and a majority of the first guided mode is contained in the first core and in at least one of the first cladding material and the second cladding material.

One or more of the following features may be included. The first guided mode may have an associated field evanescent decay length, and the trench is disposed at a distance of less than 5 evanescent decay lengths from a bottom portion of the first core. The width of the trench cross-section may be larger than a width of the first core plus 4 evanescent decay lengths. The trench height is equal to a thickness of the substrate. Substantially all of the trench may be disposed below the entire first optical waveguide.

A nearest sidewall portion of the trench may be disposed at a distance equal to at least 2 evanescent decay lengths from the first core. A cross-section of the first optical waveguide may have a width and be disposed over the trench, such that the cross-section of the first optical waveguide is disposed between two opposing sidewall portions of the trench. The first and the second cladding material may be rigidly connected.

The structure may include an optical ring resonator, with the optical ring resonator including the first optical waveguide. Each cross-sectional dimension of the first optical waveguide may be less than 1.5 µm.

The first guided mode may have an associated operating wavelength range having a center free-space wavelength, and each cross-sectional dimension of said first optical waveguide may be smaller than the center free-space wavelength.

The structure may include a second optical waveguide having a second core including a second core material and a second guided mode, the second guided mode having second associated field evanescent decay length. The second optical waveguide may be disposed at a second distance from one of the trench sidewalls, the second distance being at least 2 evanescent decay lengths. The first optical waveguide and the second optical waveguide may be optically coupled.

The first and second cladding materials may be the same material. At least one of the first and second cladding materials is solid.

A refractive index of the substrate may be higher than a maximum cladding refractive index of the first and second cladding materials. The first and second cladding materials define at least a portion of the dielectric stack of an integrated circuit.

In still another aspect, the invention includes a method for forming a structure. The method includes defining the optical waveguide in a layer disposed over a substrate, the optical waveguide having a core material and a guided mode. An access port is defined through the layer. A portion of the substrate underneath the optical waveguide is removed to form a recess in the substrate.

One or more of the following features may be included. The layer may include a first cladding material and a second cladding material. The first core material and at least one of the first and second cladding materials may have an index contrast of greater than 10%. A majority of the first guided mode may be contained in the first core material and in at least one of the first cladding material and the second cladding material.

The substrate may include at least one of a group IV element or compound, a III-V compound, and/or a II-VI compound.

Defining the access port include reactive ion etching and/or performing a wet chemical etch. Removing the portion of the substrate may include a dry etch, e.g., a non-ionized fluorine-containing gas and/or a plasma-based dry etch that may use an etch gas comprising a halogen.

Removing the portion of the substrate may include performing a wet chemical etch to form the recess. The access port may be filled after the formation of the recess.

In yet another aspect, embodiments of the invention feature a method for forming a structure. The method includes defining an optical waveguide in a layer disposed over a top surface of a substrate, the optical waveguide having a core material and a guided mode. The layer may include a first cladding material and a second cladding material. A trench may be formed in a backside of the substrate, the trench (i) having a cross-section defined by a width separating two sidewalls of the trench and a height, and (ii) terminating at a bottom surface of the layer beneath the optical waveguide.

One or more of the following features may be included. The first core material and at least one of the first and second cladding materials may have an index contrast of greater than 10%. A majority of the first guided mode is contained in the first core material and in at least one of the first cladding material and the second cladding material.

The substrate may include at least one of a group IV element or compound, a III-V compound, and/or a II-VI compound.

Forming the trench may include reactive ion etching and/or performing a chemical wet etch. The chemical wet etch may etch the substrate selectively with respect to at least one of the first and second cladding materials.

The first and second cladding materials may be the same, or they may be different.

BRIEF DESCRIPTION OF FIGURES

In the drawings, like reference characters generally refer to the same features throughout the different views. Also, the drawings are not necessarily to scale, emphasis instead being placed upon illustrating the principles of the invention.

DETAILED DESCRIPTION

In accordance with embodiments of the invention, photonic structures are fabricated using processing techniques and process flows conventionally used in the fabrication of integrated circuits, e.g., material deposition, lithography, etching, etc.

Figure 1A:
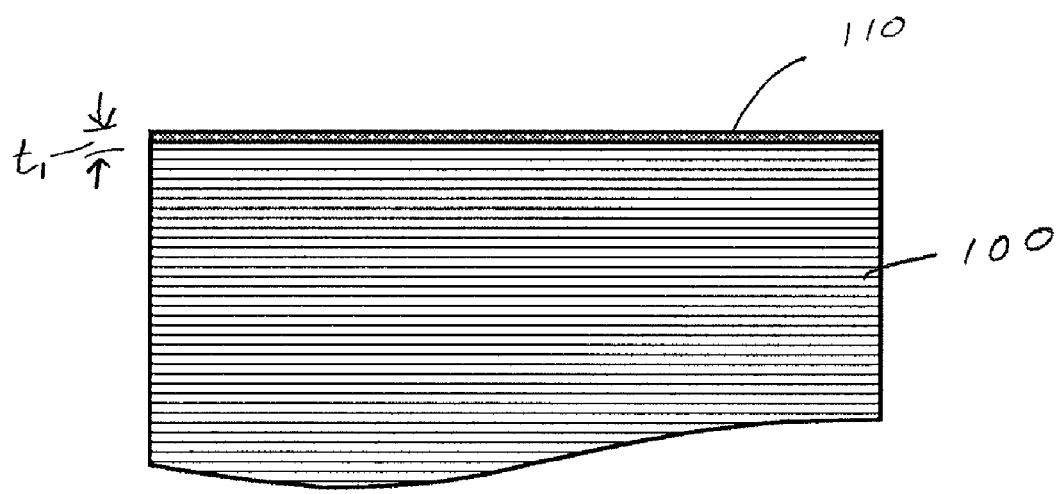
FIGS. 1a-1f are schematic cross-sectional views illustrating a device fabricated in accordance with a first embodiment of the invention.

An optical device may be formed as follows. Referring to FIG. 1a, a substrate 100 may be a semiconductor substrate, including or consisting essentially of a group IV element or compound, such as Si, Ge, SiGe, and SiC; a III-V compound, such as GaAs, InGaAs, GaInP, GaN, InGaN, AlGaN, and InP; and/or a II-VI compound, such as CdTe and ZnSe. An example of a suitable semiconductor substrate is bulk Si. As described below, substrate 100 may be a bottom portion of a silicon-on-insulator (SOI) wafer. In some embodiments, an integrated circuit (not shown) is formed on the substrate prior to the execution of the substrate removal processes described herein.

In the illustrated embodiment, a protective barrier layer 110 is formed over the substrate 100. The protective barrier 110 may include a dielectric layer, such as silicon dioxide ($SiO_2$) grown by thermal oxidation in a quartz tube, such as the MRL Industries Model 718 System. The protective barrier protects the photonic devices from being damaged by an isotropic etchant used in further processing. The material forming the protective barrier is preferably impervious to any isotropic etchants used in further processing. Preferably, the protective barrier is thin enough to avoid adversely affecting nearby electronic circuits or to require additional processing steps for its formation. The protective barrier is preferably thick enough to protect the photonic devices from being damaged from the isotropic etchant used in further processing, and thin enough to avoid the challenges incurred by the use of thick undercladding layers. For example, the protective barrier may have a thickness $t_1$ selected from a range of, e.g., 5 nanometers (nm) to 1 μm, preferably about 350 nm, i.e., the thickness of shallow-trench isolation dielectric layers typically formed during complementary-metal-oxide-semiconductor (CMOS) processing.

Figure 1B:
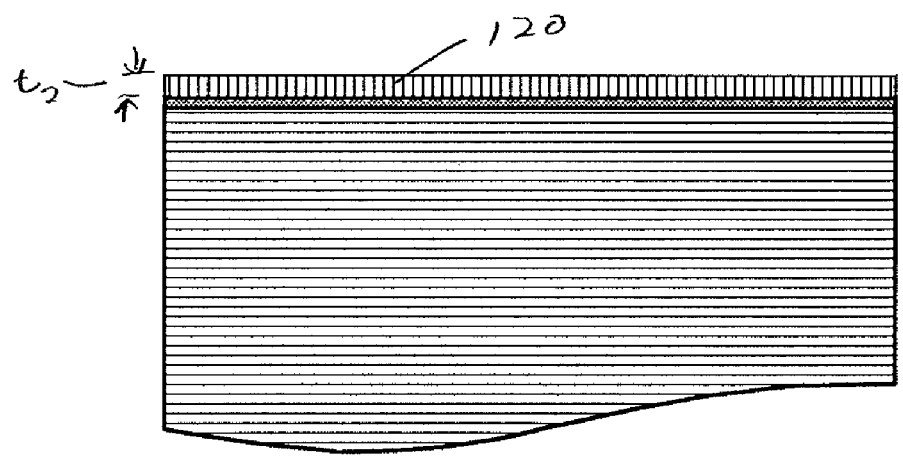

Referring to FIG. 1b, a core material layer 120 is defined over the protective barrier 110. The core material may be formed by, e.g., chemical vapor deposition (CVD) in a Surface Technology Systems MPX CVD system. The core material may include or consist essentially of, for example, polycrystalline silicon, single crystal silicon, amorphous silicon, $Si_3N_4$, $Si_xN_y$, $SiO_xN_y$, SiC, $Si_xGe_y$, GaAs, AlGaAs, InGaAs, and/or InP. The core material may be selected such that it has a higher index of refraction than the first and second cladding materials (described below) and low optical absorption at a desired operational wavelength range, for example, 1525 nm-1565 nm or 1180 nm-1260 nm. The core material layer 120 has a thickness $t_2$ that is preferably thin enough to prevent confinement of higher-order modes, and thick enough to support the propagation of at least one of the lower-order modes corresponding to the desired operational wavelength range. The order of the mode is defined as the number of field maximums of the operational wavelength that are contained in the first core. Generally, it is desirable for the core to support propagation only of the first order modes (only one field maximum), which may be the fundamental transverse electric mode, the fundamental transverse magnetic mode, or some combination of the two. The core material layer 120 and the protective barrier 110 layer, either alone or in combination, preferably have a thickness sufficient to provide adequate mechanical support to prevent photonic devices to be made thereover from collapsing after a portion of the substrate is locally removed. For example, the thickness $t_2$ of the core material layer 120 may be selected from a range of, e.g., 30 nm to 1 μm, and is preferably about 80 nm.

In some embodiments, substrate 100 may be a bulk semiconductor substrate, forming the bottom portion of an SOI wafer containing a thin buried oxide layer (e.g., <1 μm), with the protective barrier including the buried insulator layer of the SOI wafer, and the core material layer 120 including the Si device layer defined as the top portion of the SOI wafer.

Figure 1C:
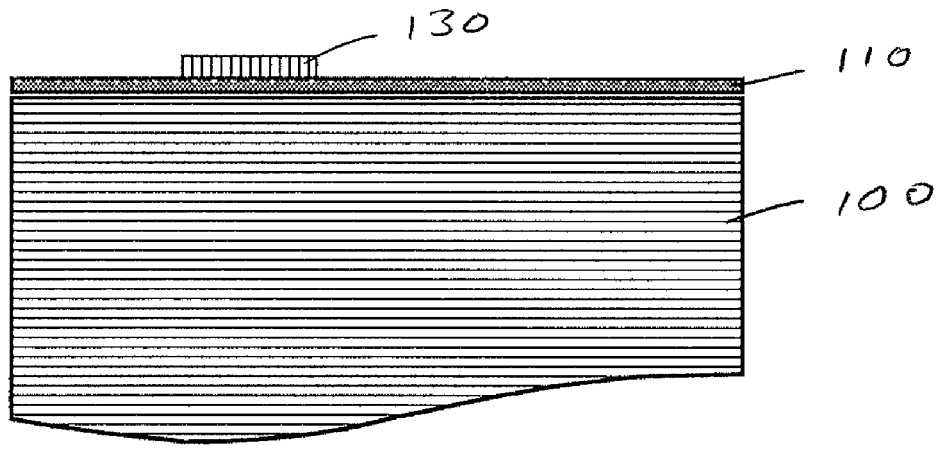

As shown in FIG. 1c, core material layer 120 is patterned to define at least a portion of a photonic device 130, e.g., a waveguide core. The core material layer 120 may be patterned by conventional photolithography and etch processes. A photoresist layer (not shown) is formed over the core material layer 120 and patterned by, e.g., contact lithography with a contact aligner such as a Karl Suss Model MA6. The pattern in the photoresist layer is used to define features in the core material 120 by selective removal by, e.g., reactive ion etching (RIE) with a suitable etch gas, such as chlorine, in a reactive ion etcher, such as the PlasmaQuest single chamber RIE system. The photoresist is stripped by a wet strip, e.g., acetone.

The photonic device 130 may be a first optical waveguide disposed over a top surface of the substrate. The first optical waveguide may include a first core material, i.e., the material of core material layer 120. Each cross-sectional dimension of the first optical waveguide, i.e., width, height, and/or diameter, may be less than 1.5 μm. The first optical waveguide may have a first guided mode having a first field evanescent decay length. The evanescent decay length is defined as the distance from the nearest point of the optical waveguide core to a point outside the core where the electric field has decreased by a factor of 1/e, where e is the base of natural logarithms. For HIC photonic devices this distance is typically less than 1 μm. The first guided mode may include an associate operating wavelength range having a center free-space wavelength, and each cross-sectional dimension of the first optical waveguide may be smaller than the center free-space wavelength. For example, the C-band used for telecommunications, which includes wavelengths in the range of 1525 nm-1565 nm, is typically defined by a center free-space wavelength of 1550 nm.

Figure 1D:
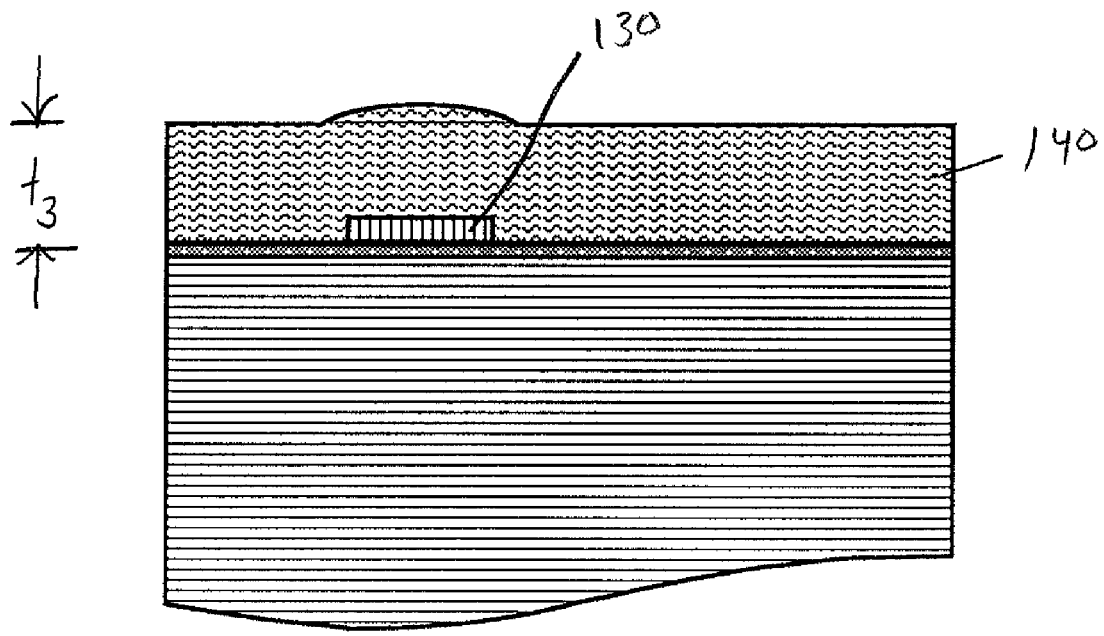

Referring to FIG. 1d, an overcladding layer 140 is deposited over the photonic device 130. The overcladding layer 140 may include a plurality of layers such as etch stop layers, low-k dielectrics, and passivation layers. For integrated circuit applications the overcladding layer 140 may include backend dielectrics, metal interconnects, and passivation layers.

The overcladding layer 140 may include a first cladding material that contacts the core of the optical waveguide of photonic device 130. A second cladding material may contact the substrate, with the first and second cladding materials being rigidly connected. The first and second cladding materials may each be the same material, e.g., $SiO_2$. In some embodiments, the first and second cladding materials are different materials, e.g., the first cladding material may be $Si_3N_4$ and the second cladding material may be $SiO_2$. At least one of the first and second cladding materials may be a solid.

In some embodiments, the first cladding material may be an ambient atmosphere, e.g., air. The photonic device 130 may be a sensor, with the first cladding material including the gas or liquid that is to be sensed. The refractive index of the substrate may be higher than a maximum cladding refractive index of the first and second cladding materials. For example, the substrate may consist essentially of Si with a refractive index of 3.52, the first cladding material may be $Si_3N_4$ with a refractive index of 1.98 and the second cladding material may be $SiO_2$ with a refractive index of 1.45. If the refractive index of the substrate is lower than that of the first and second cladding materials, optical loss into the substrate may not be significant, and the substrate-removal techniques described herein may not be necessary. Such substrates with low refractive indices, however, are not widely used, as mentioned above.

In some embodiments, the protective barrier 110 layer may include the second cladding material. In other embodiments, a protective barrier 110 is not necessary for protecting the photonic device 130 during further processing. For example, the photonic device 130 may be formed from $Si_3N_4$, and a fluorine-containing etchant gas $XeF_2$ is used for substrate removal, as discussed below. Because the $Si_3N_4$ is not etched by $XeF_2$, a protective barrier may not be necessary. A second cladding material, however, may still be desired, to support the photonic device. In the latter case, the configuration of the second cladding material is equivalent to that of the protective barrier 110, i.e., the second cladding material may be a layer underlying the photonic device and contacting the substrate.

In an illustrative embodiment, overcladding layer 140 is a dielectric layer consisting essentially of $SiO_2$, deposited by CVD, e.g., by a Surface Technology Systems MPX CVD system, and subsequently annealed at 800° C. in a nitrogen ($N_2$) atmosphere to remove pinhole defects in the film. The annealing may be performed in a furnace, such as an MRL Industries Model 718 System.

The overcladding layer 140 may be a solid material having a thickness that is as thin as possible, to reduce materials costs and to reduce device size, while being thick enough to provide protection to the photonic device. Accordingly, the overcladding layer 140 may have a thickness $t_3$ ranging from, e.g., 5 nm to 50 μm.

Figure 1E:
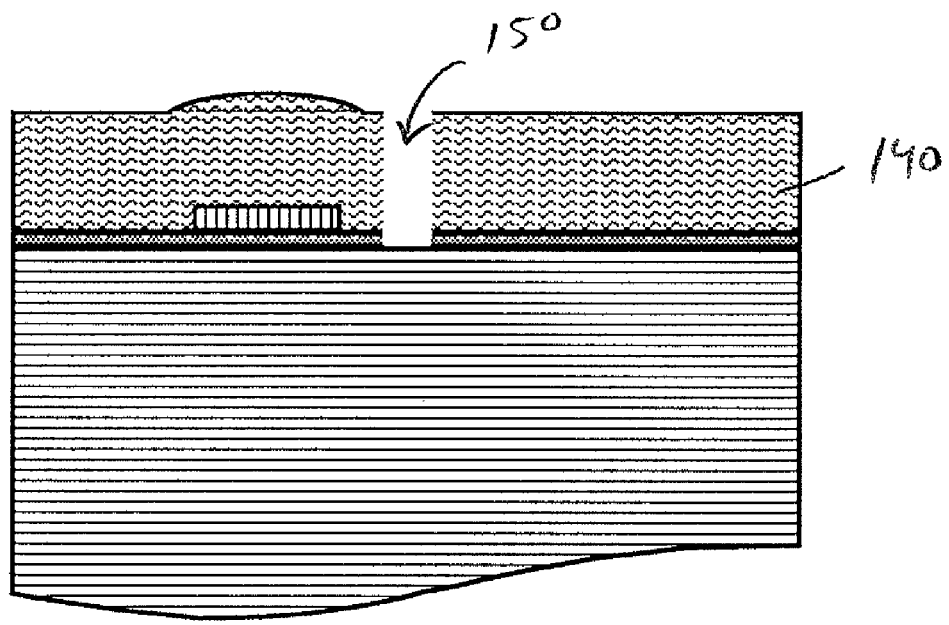

In a frontside process, referring to FIG. 1e, an access port 150, i.e., an etch hole, is defined in the overcladding layer 140 proximate, but not directly over, the photonic device 130. The access port 150 may be defined by, e.g., a conventional photolithography and etch process. A photoresist layer (not shown) is formed over the core material layer 120, and patterned by, e.g., contact lithography with a contact aligner, such as a Karl Suss Model MA6. The pattern in the photoresist layer is used to define the access port 150 in the overcladding layer 140 and the barrier layer 110 by selective removal by, e.g., reactive ion etching (RIE) with a suitable etch gas, such as $CF_4$, in a reactive ion etcher, such as the PlasmaTherm single chamber RIE system. The photoresist is subsequently stripped by a wet strip, e.g., acetone.

Figure 1F:
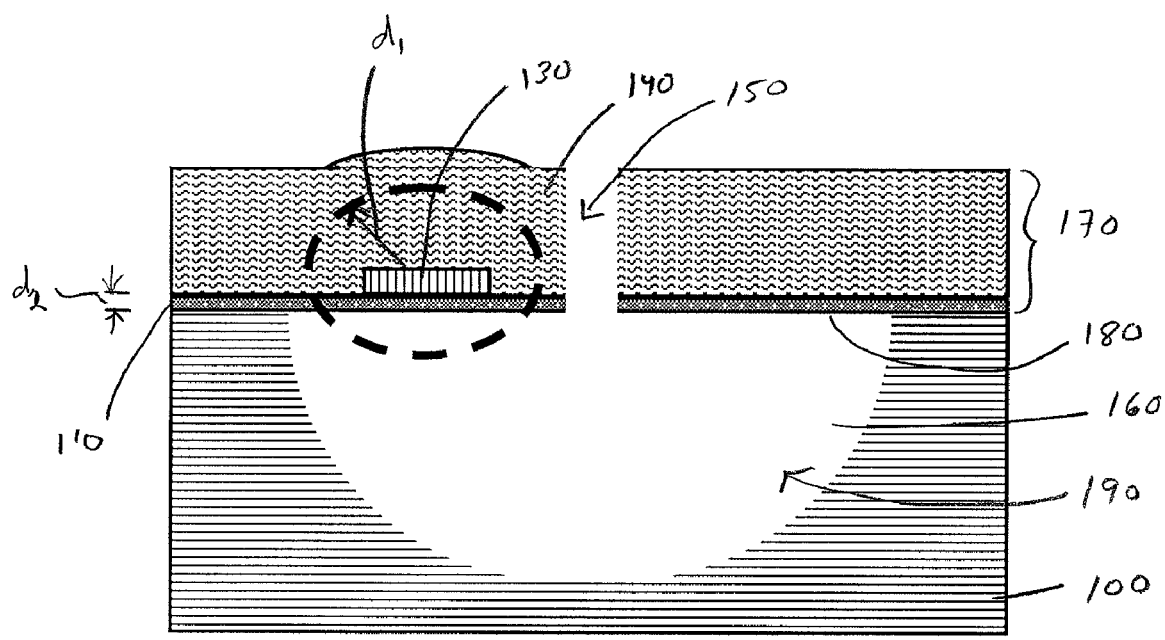

Referring to FIG. 1f, a portion of the substrate 100 in close proximity to the photonic device 130 is locally removed to define a recess 160 in the substrate 100. The substrate portion may be removed by, e.g., introducing an etchant through access port 150. For example, one may perform a $XeF_2$ etch in a $XeF_2$ pulse (pump/etch/pump) etching tool, e.g., a VPE-4F system manufactured by SAMCO. Although $XeF_2$ may be capable of etching the photonic device 130 as well as the substrate 100, the barrier layer 110 and overcladding layer 140 protect the photonic device 130 from the etchant. The pulse etch is continued until all portions of the substrate 100 disposed within a distance of about 5 evanescent decay lengths from the photonic device (e.g., waveguide core) have been removed. Removing the substrate portions disposed within this distance is generally sufficient to adequately reduce optical losses into the substrate. The amount of power present at a distance $d_1$ of more than 5 evanescent decay lengths from a waveguide core is typically less than 0.5% and, therefore, does not result in leakage of a significant amount of power. Optical loss due to power leakage into the substrate may be reduce to less than 1 dB/cm by removing portions of the substrate. In practice, losses due to other mechanisms (e.g., surface roughness and material absorption) may result in the loss from the waveguide core to be significantly larger. Without removal of this substrate portion, however, the optical loss of the waveguide core typically exceeds 500 dB/cm.

The substrate portion may also be removed through the access port 150 by a dry etch that includes a plasma-based dry etch, e.g., an etch performed on a Branson/IPC P2000 Barrel Etcher system using an etch gas that may include a halogen, such as $CF_4$, $SF_6$, HBr, $Cl_2$, $BCl_3$, $Br_2$, $NF_3$, $CH_yF_x$, and/or $C_wF_z$, where w, x, y, and z are $\geq 1$, e.g., $CF_4$. Halogen-containing plasmas are generally capable of isotropically etching the substrate, resulting in undercut features. By increasing the etch pressure and pumping the chamber to a lower pressure between etch steps to remove the etch products, it is possible to increase this undercut and remove the desired portion of the substrate through the access port(s) 150.

A layer 170 is disposed over the recess 160. In the illustrated embodiment, layer 170 includes protective barrier layer 110, overcladding layer 140, and photonic device 130, which itself includes a portion of core material layer 120. The layer 170 may include at least a portion of the second cladding material. The recess 160 and a bottom surface 180 of layer 170 define a chamber 190. The cross-section of the access port 150 is defined by the area of intersection of the access port and the chamber 190. The surface area of the chamber 190 is the sum of (i) the surface area of the recess 160 and (ii) the area of the portion of the bottom surface of the layer 170 that is disposed over the recess 160, minus the area of the cross-section of the access port 150. The area of the access port cross-section is less than the surface area of the chamber. Preferably, the access port cross-section is relatively small, to maintain mechanical stability, and to occupy a smaller footprint. The access port 150 is preferably sufficiently large to enable reasonably rapid etching of the underlying substrate material. Accordingly, in some embodiments, the chamber surface area may be at least 5 times, and preferably at least 10 times, the area of the cross-section of the access port 150. For example, a preferred chamber surface area may be about 100 μm² per micrometer length of the waveguide core, and a preferred access port area may be about 10 μm² per micrometer length of the waveguide core. The chamber may be filled with any material having a low-index of refraction, e.g., a gas such as air, vacuum, liquid, or a solid such as $SiO_2$, to reduce optical power leakage to the substrate. A bottom portion of the photonic device 130, e.g., of the first optical waveguide, is disposed a first distance $d_2$ from the bottom surface 180 of the layer 170. The first distance $d_2$ may be, e.g., less than 5 first evanescent decay lengths. If distance $d_2$ is too great, i.e., the bottom portion of the photonic device 130 is too distant from the bottom surface of the layer 170, the amount of optical power of the guided mode that reaches the chamber may be negligible, and thus the power loss reduced by the chamber may be insignificant. Preferably, the chamber is sized, i.e., is sufficiently deep and wide, to prevent more than 10% of the guided mode that reaches the chamber from impinging on the substrate and subsequently being lost. In some embodiments, not more than 10% of a power associated with the guided mode may be lost to the substrate per centimeter length of the first optical waveguide.

The described configuration, including photonic device 130 disposed over the chamber 190, results in an optical device having a high optical confinement. High optical confinement, as used herein, means that, in use, the majority of the optical mode propagated by an optical waveguide is contained in the waveguide core and in the solid cladding materials proximate the waveguide core, e.g., the first or second cladding materials. High optical confinement may be achieved by selecting the core and cladding materials such that there is a high index contrast of greater than 10% (percent index contrast=$(n_{core}-n_{cladding})/(n_{core}+n_{cladding})$) between the core and at least one of the cladding materials, i.e., at least one of the first and second cladding materials. This high index contrast allows for the first core dimensions to be less than the free-space wavelength associated with the first guided mode and still be capable of propagating the first guided mode by total internal reflection. High index contrast also allows for a radius of curvature of a photonic device (e.g., the radius of an optical ring resonator discussed below) to be less than 100 μm, preferably less than 20 μm, with negligible bending loss. This relatively small radius of curvature allows ease of integration, such that many devices may be fabricated on one IC.

In an embodiment, the access port 150 is connected to an ambient atmospheric environment, i.e., it remains empty during further processing. In some embodiments, the access port 150 is separated from an ambient environment, e.g., by filling it with a dielectric material, such as $SiO_2$, using a suitable process, such as CVD. It is generally desired that the fill material does not impair the performance of the photonic device, while also providing increased mechanical stability and/or increased protection from the environment.

Figure 2A:
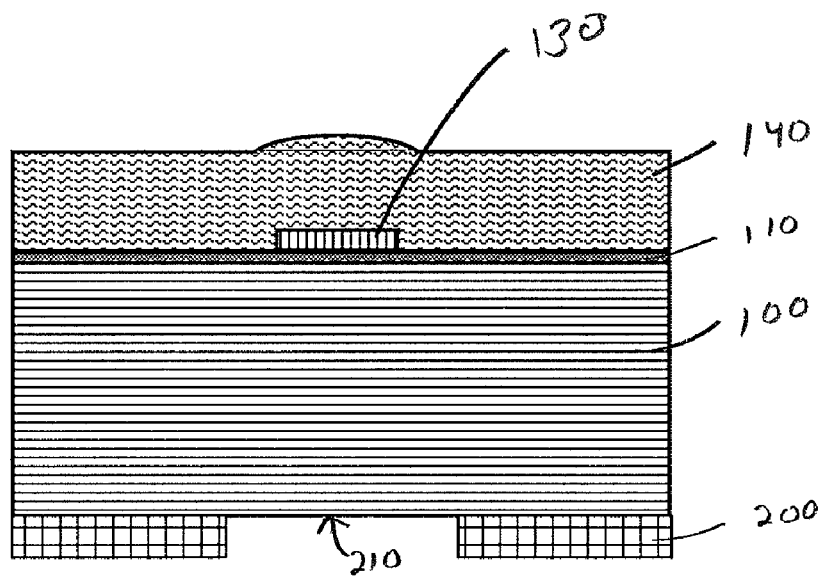
FIGS. 2a-2b are schematic cross-sectional views illustrating a device fabricated in accordance with a second embodiment of the invention.
Figure 2B:
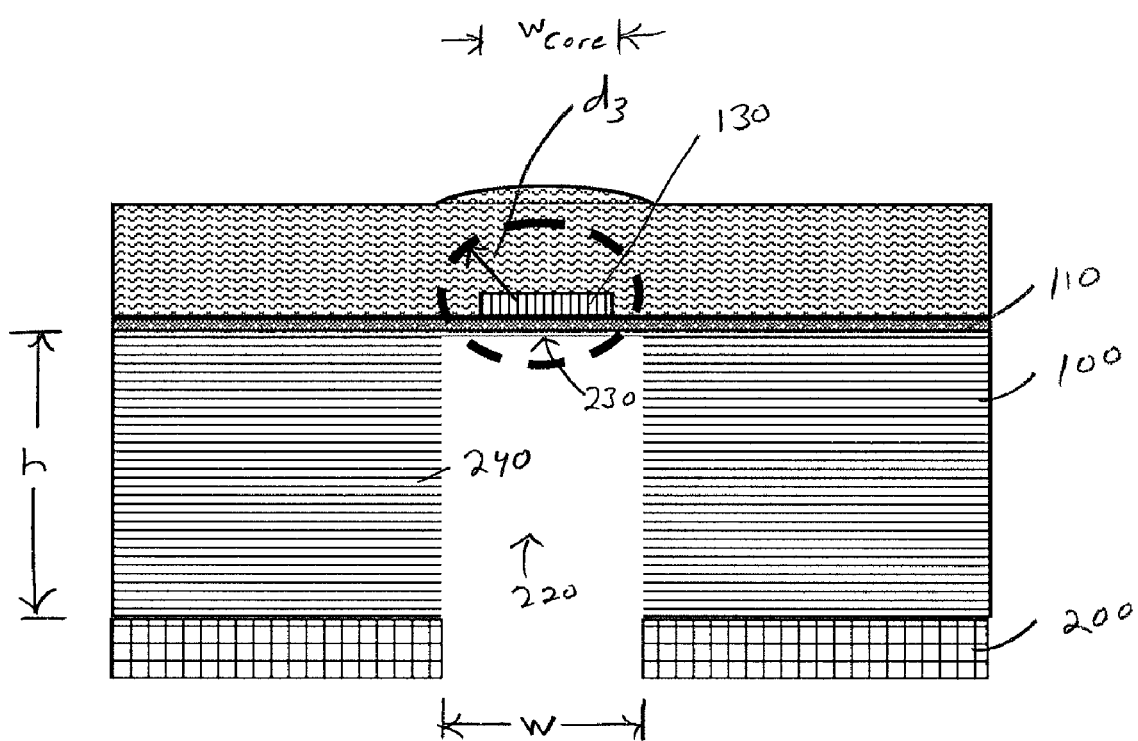

An alternative process is illustrated in FIGS. 2a-2b. Here, in a backside dry process, substrate 100 is processed as described with reference to FIGS. 1a-1d, including the deposition of overcladding layer 140. Referring to FIG. 2a, an etch mask 200 is defined on a backside 210 of the substrate 100. The etch mask 200 may be formed of photoresist that is patterned by contact lithography employing a contact aligner with backside alignment capabilities, e.g., an Electronic Visions EV620 aligner.

Referring to FIG. 2b, a trench 220 is defined in a backside of the substrate, through the substrate 100, by removing the portion of the substrate material exposed by the patterned etch mask 200. The trench may extend entirely through the thickness of the substrate, terminating at a back portion 230 of the protective barrier layer 110. The trench 220 may be defined by an anisotropic dry etch, such as a deep reactive ion etch performed by a Surface Technology Systems MPX etching system. To etch a Si substrate, a Si etchant, such as an $SF_6$ etch gas alternated with a sidewall passivation deposition step using $C_4F_8$ gas, known as the Bosch process, may be used until the trench extends close to the protective barrier layer 110, e.g., to within 1-10 μm from the protective barrier layer 110. Then, the etch chemistry may be changed to an etchant that is more selective to a dielectric material, such as HBr, $XeF_2$, or KOH. If the more selective etchant etches isotropically, the passivation deposited on the sidewalls during the Bosch process helps prevent the trench from widening everywhere but at the bottom of the trench. The isotropic etchant may be used until the trench width at the interface between the protective barrier layer, i.e., the second cladding material, and the substrate is at least 4 evanescent decay lengths greater than the width of the first waveguide core. By placing the trench directly below the photonic device 130, a portion of the substrate may be removed without the need for an isotropic lateral etch, i.e., an isotropic dry etch or a wet etch.

The trench 220 may have a cross-section defined by the trench width and height. The trench height h may be equal to the thickness of the substrate 100, e.g., 550 μm. The trench 220 may be round with a single circular sidewall 240. Alternatively, the trench 220 may have another cross-sectional shape, such as rectangular with four sidewalls. Regardless of the trench shape, the trench width w may be equal to distance between two opposing sidewall portions of the trench. In a preferred embodiment, the trench height h is at least five times the trench width w. Preferably, the width of the trench cross-section is larger than the width $w_{core}$ of the first core plus 4 evanescent decay lengths. Thus, a trench having a width w of 20 μm preferably has a trench height h of at least 100 μm.

The first optical waveguide may be disposed over the trench, such that the cross-section of the first optical waveguide is disposed between two opposing sidewall portions of the trench. A nearest sidewall portion 240 of the trench 220 may be disposed at a distance $d_3$ of at least 2 evanescent decay lengths from the photonic device 130, e.g., from the edge of the first core of the first optical waveguide. The top portion of the trench 220 is disposed a distance of less than 5 evanescent decay lengths from the photonic device 130, e.g., from the first core. Substantially all of the trench may be disposed below the entire photonic device 130, e.g., below the entire first optical waveguide.

Figure 3A:
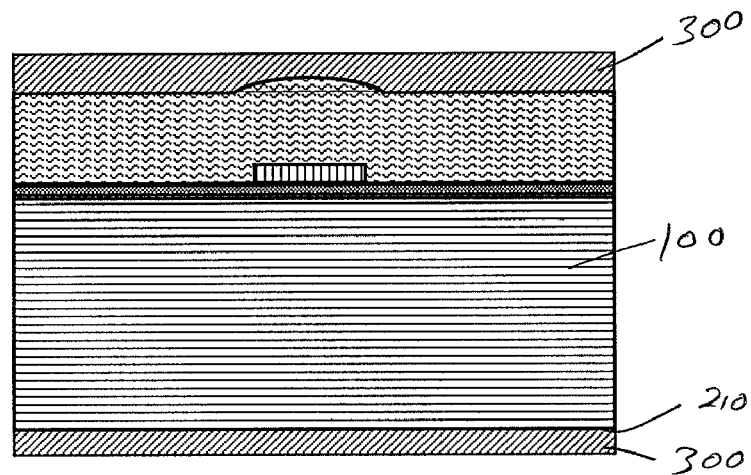
FIGS. 3a-3c are schematic cross-sectional views illustrating a device fabricated in accordance with a third embodiment of the invention.
Figure 3B:
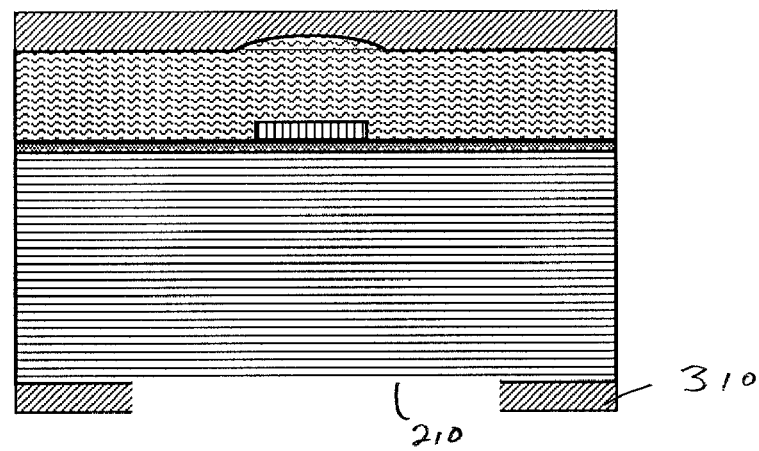
Figure 3C:
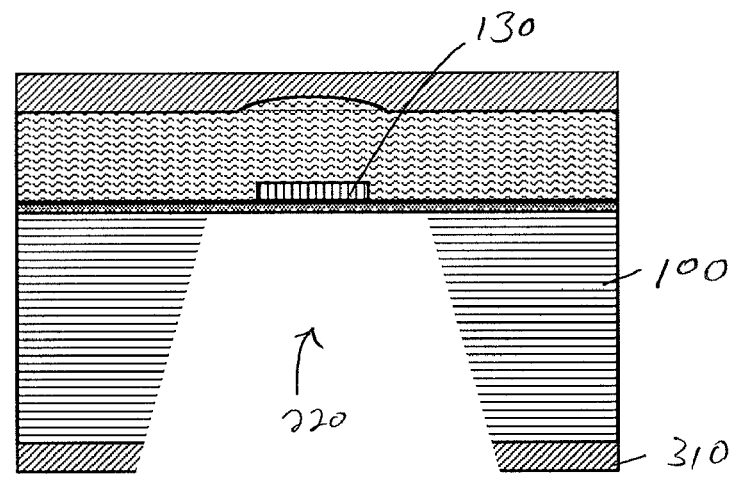

Yet another alternative process is illustrated in FIGS. 3a-3c. In a backside wet process, substrate 100 is processed as described with reference to FIGS. 1a-1d, including the deposition of overcladding layer 140. Referring to FIG. 3a, a hard mask layer 300 is formed both over the overcladding layer 140 and the backside 210 of wafer 100. Hard mask layer 300 may be, for example, a $Si_3N_4$ layer deposited by, e.g., low-pressure CVD (LPCVD) in a deposition system such as the SVG/Thermco 7000 Series vertical LPCVD furnace.

Referring to FIG. 3b, a hard etch mask 310 is defined on the backside 210 of the substrate 100 by patterning the hard mask layer 300 disposed thereon. The hard etch mask 310 may be defined by first forming a photoresist layer (not shown) on the substrate backside 210, and patterning the photoresist layer by contact lithography employing, e.g., an Electronic Visions EV620 aligner. The portion of the hard mask layer 300 exposed by the photoresist pattern may be removed by a suitable dry etch. For example, a $Si_3N_4$ hard mask layer may be patterned by $CF_4$- and $O_2$-based reactive ion etching in, e.g., a PlasmaTherm single chamber RIE etching system. The photoresist pattern is subsequently removed with, e.g., acetone.

Referring to FIG. 3c, trench 220 is defined through the substrate 100 by removing the portion of the substrate material exposed by the patterned etch hard mask 310. The trench may extend entirely through the thickness of the substrate, terminating at a back portion 230 of the protective barrier layer 110 underneath the photonic device 130. The trench 220 may be defined by an anisotropic wet etch, such a heated KOH bath at 80° C. for approximately 10 hours. The trench 220 may be filled with any material having a low-index of refraction, e.g., air or $SiO_2$, to reduce optical power leakage to the substrate.

Referring to FIG. 4a-4d, in some embodiments, the access port 150 or trench 220 may be defined between (shown) or to one side of (not shown) two neighboring photonic devices 130, 130', e.g., first and second optical waveguides. The second optical waveguide may have a second core including a second core material and a second guided mode, the second guided mode having an associated second field evanescent decay length.

Figure 4A:
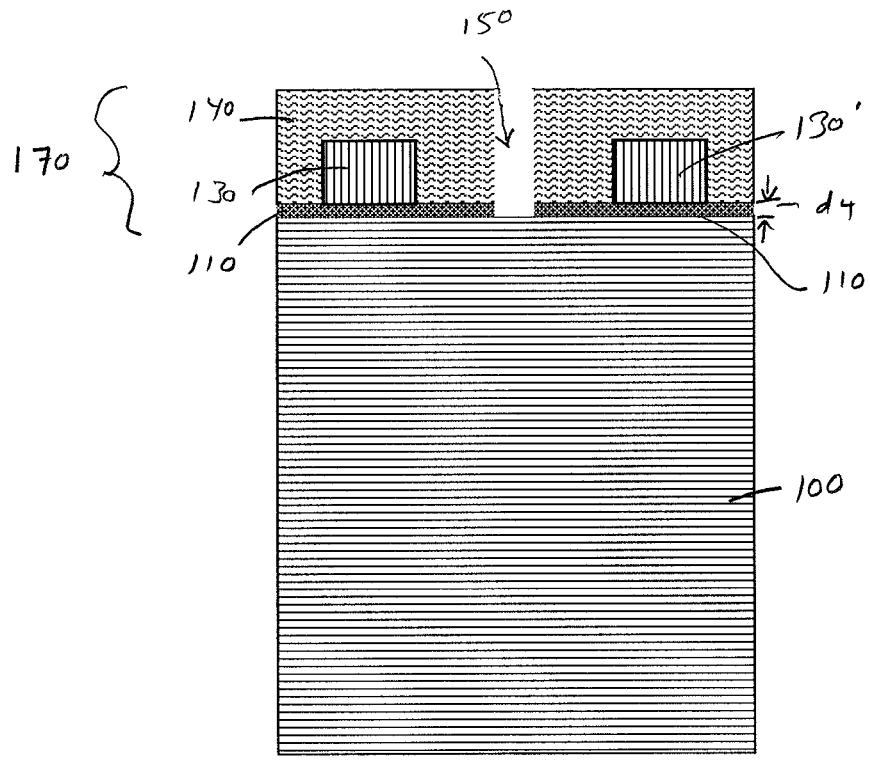
FIGS. 4a-4d are schematic cross-sectional views of photonic devices fabricated in accordance with embodiments of the invention.

In the front-side method illustrated in FIG. 4a, access port 150 is defined all the way through the overcladding layer 140 and protective barrier 110, between two photonic devices 130, 130' to the substrate 100. An advantage of the front-side method is that the access ports 150 may be self-aligned by fabricating dummy contact pads proximate the photonic structure, as discussed with reference to FIGS. 6a-6c. The dummy contact pads are arranged to be either etched away to define access ports 150, or else to act as etch masks to enable the formation of the access ports 150 next to the dummy contact pads. These dummy pads may be formed from the same metal and dielectric layers, e.g., copper, aluminum, etc. that are used for conventional contact pads for integrated circuits. However, no electrical contacts are defined to the dummy pads. Rather, during further processing, the dummy pads may be chemically etched away with a wet etch such as aluminum etch type A from Transene or a dry method using ion milling to define access ports. Alternatively, when the dummy pads are positioned to act as an etch mask for access port formation, reactive ion etching is used to remove the portions of the dielectric material disposed over the substrate that are not masked by the dummy pads. The use of dummy contact pads may eliminate or reduce the alignment accuracy requirements for the lithography step used to define the access port.

Next, as discussed above with respect to FIGS. 1a-1f, an isotropic etch is performed to preferentially etch the exposed substrate through the access port. The isotropic nature of this etch creates a large undercut near the access port. After etching for an appropriate length of time, this undercut removes a portion of the substrate disposed below both photonic devices 130, 130'.

The bottom portion of the second optical waveguide may be disposed at a second distance $d_4$ from the bottom surface of the layer 170, with the second distance $d_4$ being smaller than 5 second evanescent decay lengths. The first and second optical waveguides may be positioned in close proximity to each other allowing the optical mode of the first waveguide to evanescently couple to the second waveguide.

Figure 4B:
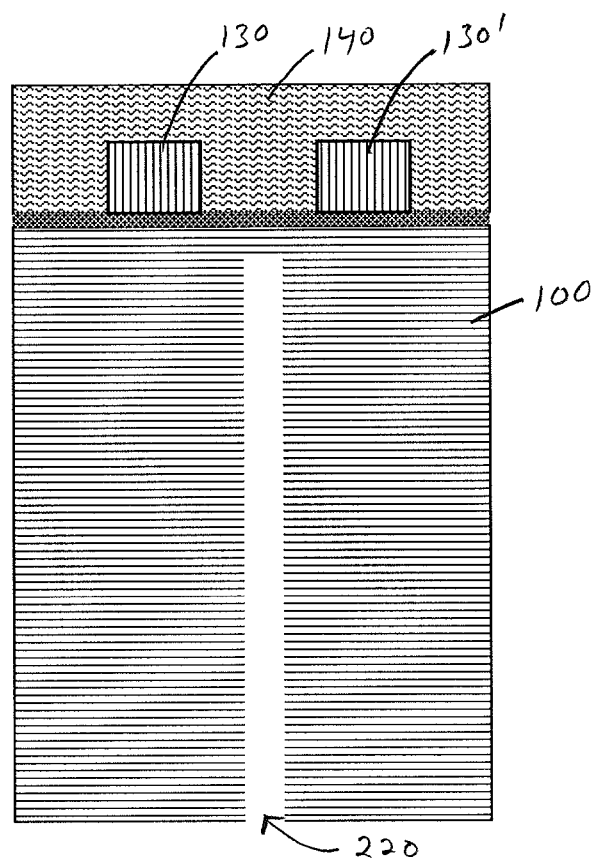

Referring to FIG. 4b, trench 220 may be disposed between two photonic devices 130, 130', e.g., between first and second optical waveguides. The second optical waveguide may have a second core including a second core material and a second guided mode, with the second guided mode having a second associated field evanescent decay length. The second optical waveguide may be disposed at a second distance from a sidewall of the trench, with the second distance being at least 2 evanescent decay lengths to eliminate an excess loss due to leakage into the substrate. The distance between the first and second optical waveguides may be small enough (less than 5 evanescent decay lengths) to allow at least a portion of the optical power associated with the two waveguides to be transferred between the two waveguides through evanescent coupling.

Figure 4C:
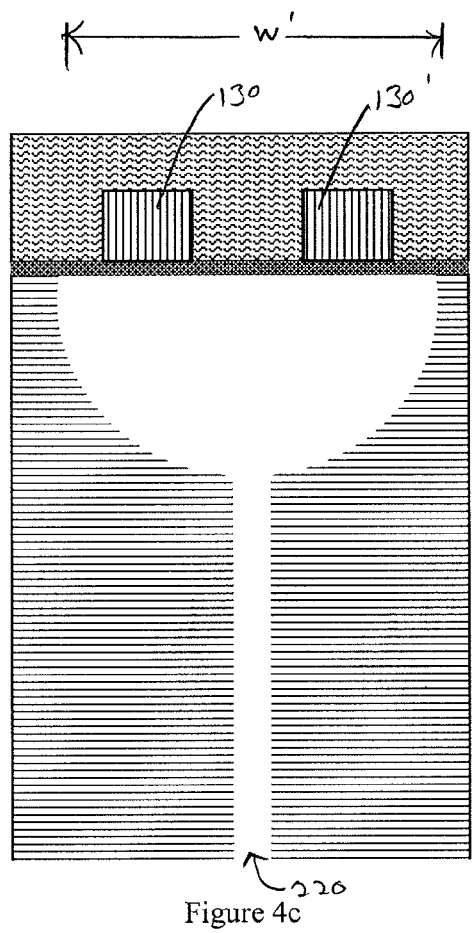

Referring to FIG. 4c, an isotropic etch may be used to finish forming trench 220. The isotropic etch may extend the trench width w' at the interface between the substrate and the second cladding material to a width that is equal to at least the sum of (i) the distance between two photonic devices 130, 130', (ii) the width of the core of the first photonic device 130, (ii) the width of the core of the second photonic device 130', (iii) 2 first evanescent decay lengths, and (iv) 2 second evanescent decay lengths.

Figure 4D:
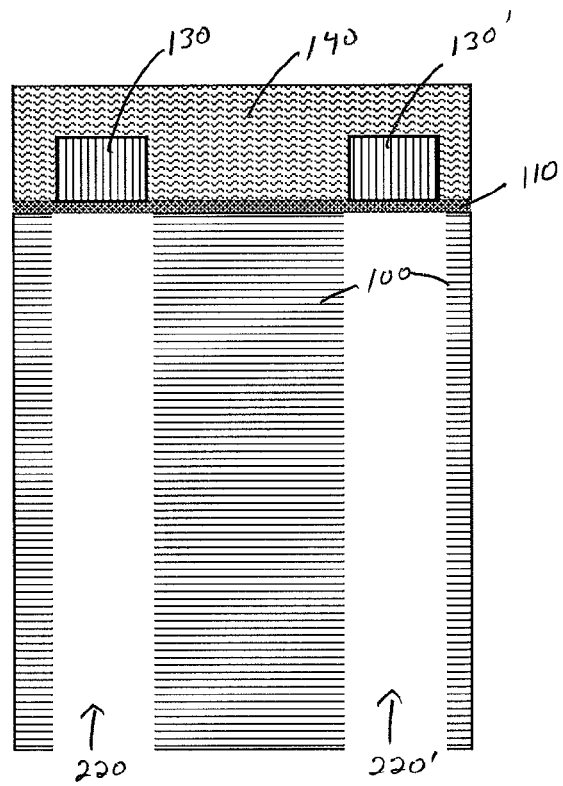

Referring to FIG. 4d, trenches 220, 220' may be formed directly beneath photonic devices 130, 130', e.g., below first and second optical waveguides. Because the trenches are disposed directly under the photonic devices, no additional undercut is needed and, therefore, solely an anisotropic etch may be used to define the trenches 220.

Figure 5A:
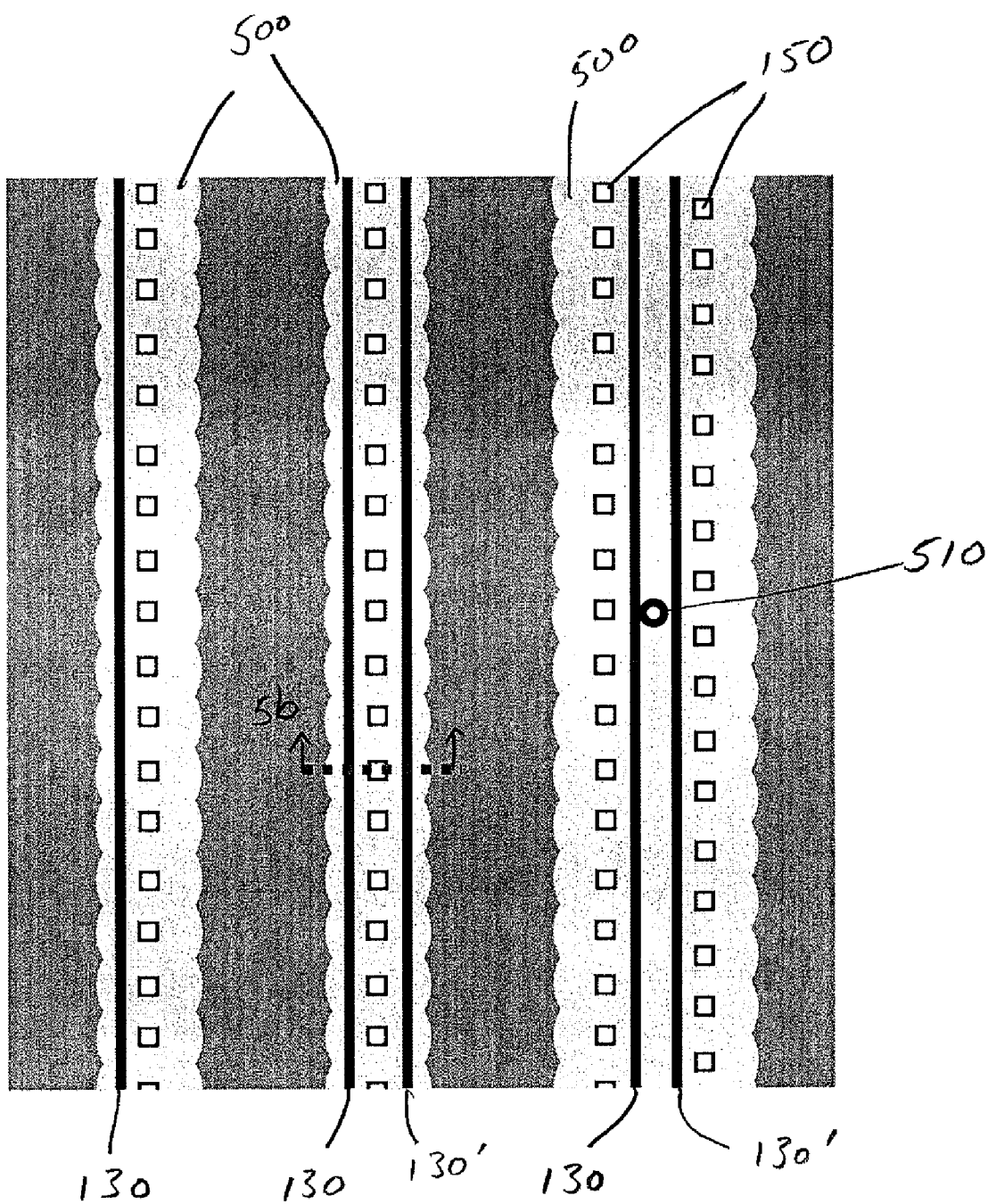
FIGS. 5a-5b are schematic top and cross-sectional views of a plurality of photonic devices fabricated in accordance with a first embodiment of the invention.
Figure 5B:
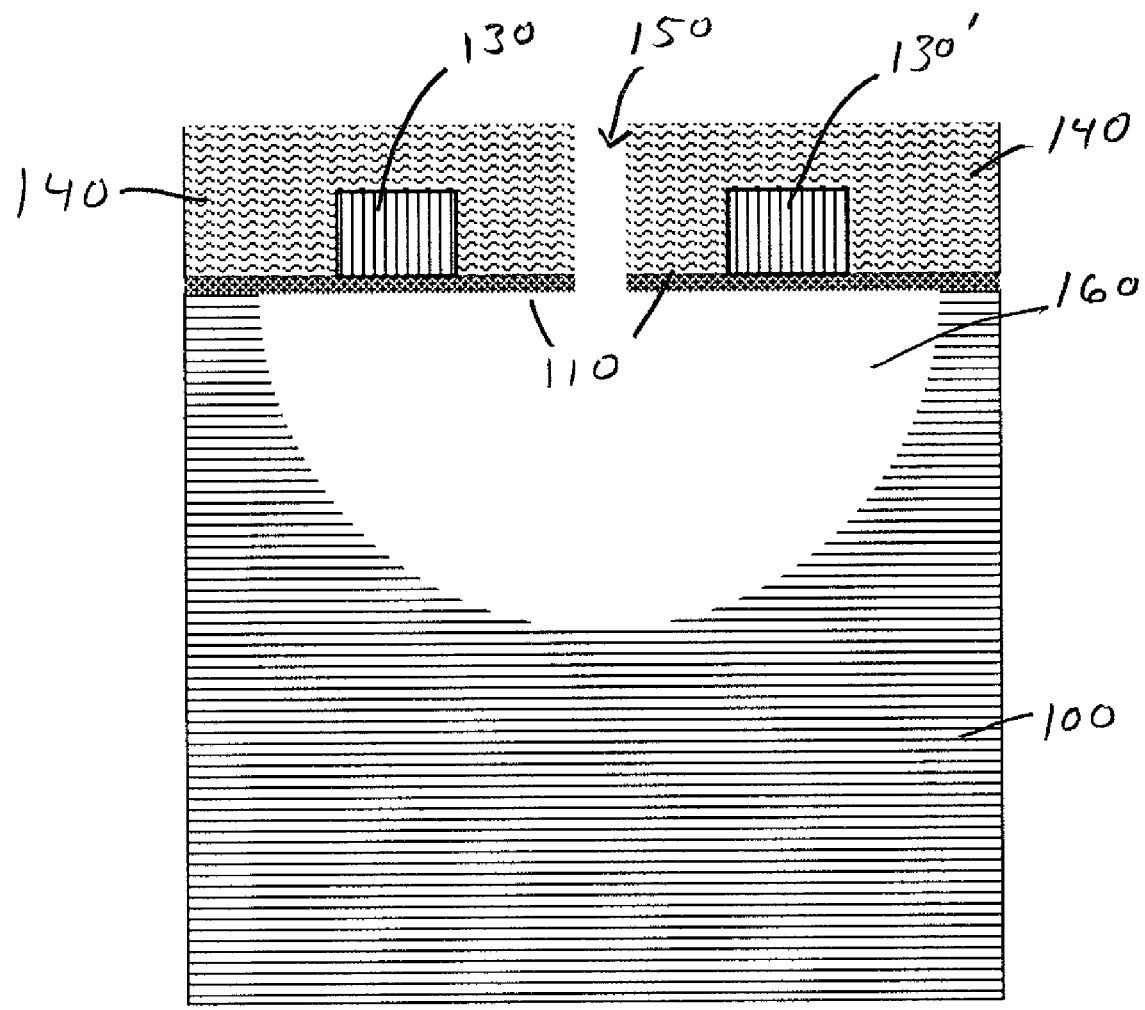

Referring to FIG. 5a-5b, top and cross-sectional views, respectively, illustrate embodiments with multiple photonic devices 130, 130', with access ports 150 defined on the topside of substrate 100 and portions 500 of the substrate 100 removed, thereby defining recess 160. The structure may also include an optical ring resonator 510, including the photonic device 130, e.g., including the first optical waveguide.

It has been found experimentally that 3 μm diameter access ports spaced by 8 μm allow one to locally remove the substrate located within 5 evanescent decay lengths of a polycrystalline-Si waveguide. The radius of the recess formed in the substrate was approximately 12 μm. The first cladding material was 400 nm of $SiO_2$ and the second cladding material was 50 nm of $SiO_2$. The two cladding layers are sufficiently mechanically stable to support both straight and curved poly-Si waveguides. Optical loss measurements were performed on such waveguides, with measured values in the range of 20 dB/cm. This loss, attributable to material absorption and sidewall roughness, may be reduced further with process optimization. If such structures had been fabricated without the localized substrate removal, the optical loss due to substrate leakage alone would exceed 500 dB/cm.

Figure 6A:
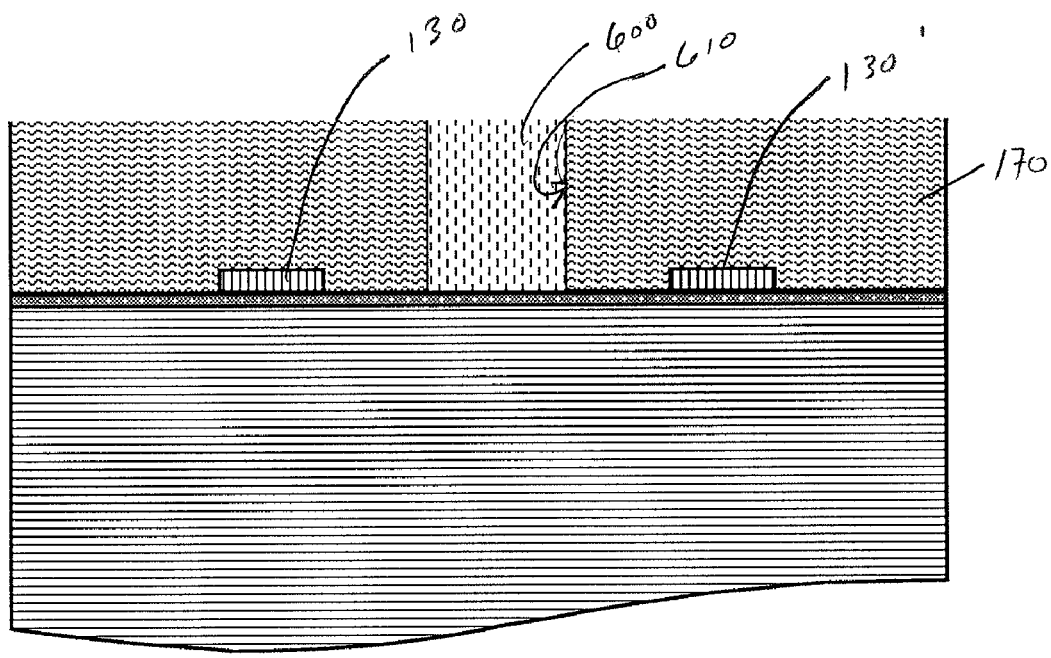
FIGS. 6a-6c are schematic cross-sectional views illustrating a self-aligned process with localized substrate removal, in accordance with an embodiment of the invention.
Figure 6B:
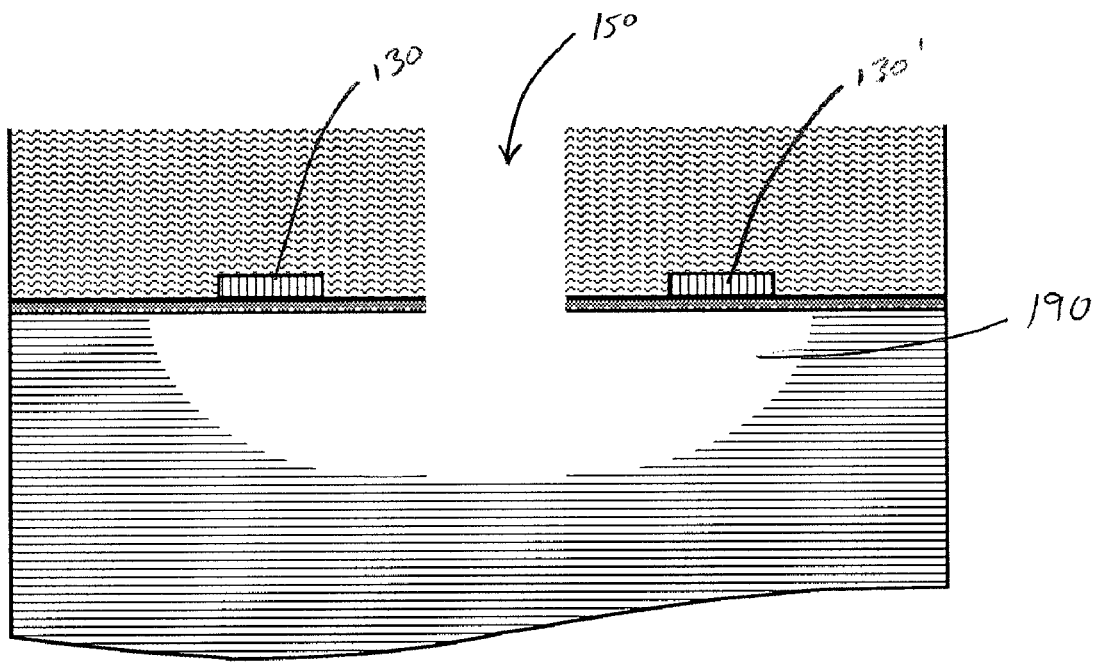
Figure 6C:
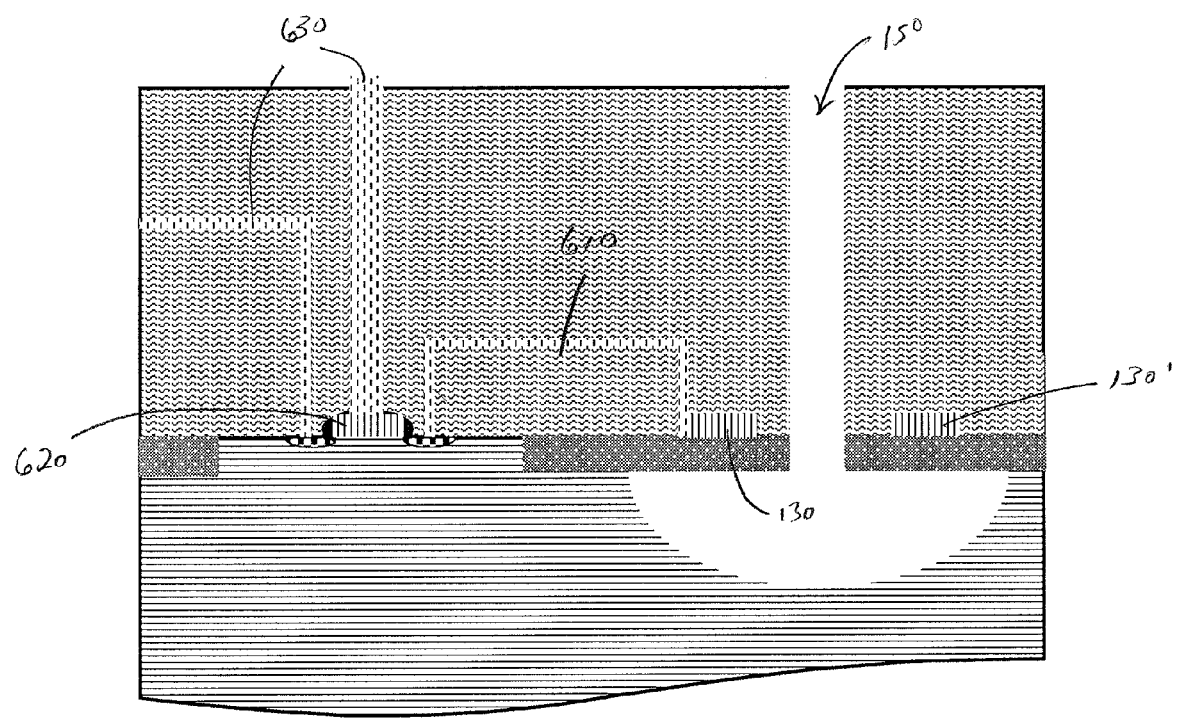

An example of how embodiments of the invention may be applied in a full integrated circuit fabrication flow is shown in FIGS. 6a-6c, in which processing features formed during IC fabrication (FIG. 6a) enable efficient, self-aligned post-processing to form photonic devices 130, 130' with a recess disposed thereunder (FIG. 6b). In particular, referring to FIG. 6a, a dummy contact pad 600 is formed near photonic devices 130, 130' during IC fabrication, e.g., in a dual damascene process. The dummy contact pad is formed simultaneously with the formation of the contact pads that are to be used for making electric contact to the IC. Therefore, the formation of the dummy pads does not require additional processing steps. The formation of dummy contact pads provides etch selectivity between the dummy pads and other portions of layer 170. After dummy pad formation, therefore, by choosing the appropriate etching method, one may either selectively remove the dummy pad (using a wet chemical etch or ion milling) or selectively remove the area where the dummy pads are not located (using, e.g., a $CF_4$-based reactive ion etching).

Referring to FIG. 6b, in an embodiment, the dummy contact pad 600 is removed with either a wet chemical etch or ion milling, to define an access port 150. A chamber 190 is defined, as discussed above.

Referring to FIG. 6c, the photonic devices 130, 130' may be in electrical communication with integrated circuit components, e.g., a transistor 620. Interconnects 630 connect the transistor to photonic device 130, as well as to other devices and packaging (not shown). The integration of electronic components with the photonic device may enable the formation of active photonic devices, such as modulators and photodetectors.

Embodiments of the invention allow the integration of photonic devices with integrated electronic circuits without changing the process flow, materials, or layer thicknesses that are typically used to fabricate electronic devices. Because such process flows are usually highly optimized for electronic device fabrication, changes to the process flows are preferably kept to a low level, in order to reduce costs and to avoid compromising the performance of the electronic devices.

The methods described herein assist in the achievement of this goal by adding only several steps after the electronic devices are fabricated. As discussed above, these post-processing steps involve etching to locally remove the substrate portions to reduce optical power leakage to the substrate. By only removing the substrate locally, the electronic devices and the mechanical stability of the chip are maintained.

The methods described above may be incorporated into various integrated circuit fabrication processes, thereby enabling full integration of photonic devices without significant change to the fabrication processes. Integrated circuits that combine electronic and photonic components may potentially enable the achievement of devices with higher speeds and lower power consumption.

The above description provides several examples of processes that may be used to locally remove the substrate below the photonic device, for the purpose of reducing optical loss. The concept of this invention is not limited to these examples, particular method, or type of substrate. The invention may be embodied in other specific forms without departing from the spirit or essential characteristics thereof. The foregoing embodiments are therefore to be considered in all respects illustrative of the invention described herein. Various features and elements of the different embodiments can be used in different combinations and permutations, as will be apparent to those skilled in the art. The scope of the invention is thus indicated by the appended claims rather than by the foregoing description, and all changes which come within the meaning and range of equivalency of the claims are therefore intended to be embraced herein.

What is claimed is:

1. A structure comprising:
   a substrate having a recess defined in a frontside thereof such that the substrate defines side and bottom surfaces of the recess;
   a layer disposed over the recess, (i) the layer comprising a first cladding material and a second cladding material, and (ii) the recess and a bottom surface of the layer defining a chamber; and
   a first optical waveguide disposed in the layer, the first optical waveguide having (i) a first core including a first core material and (ii) a first guided mode having a first field evanescent decay length,
   wherein (i) the first cladding material contacts the first core, the second cladding material contacts the substrate, and the first and second cladding materials are rigidly connected, (ii) the first core and at least one of the first and second cladding materials have an index contrast of greater than 10%, (iii) a majority of the first guided mode is contained in the core and in at least one of the first cladding material and the second cladding material, (iv) the first optical waveguide is disposed over the recess, and (v) all portions of the substrate disposed within about 5 first field evanescent decay lengths from the first optical waveguide are removed to define the recess.

2. The structure of claim 1, wherein (i) a bottom portion of the first optical waveguide is disposed a first distance from the bottom surface of the layer, and (ii) the first distance is less than 5 first evanescent decay lengths.

3. The structure of claim 1, wherein (i) the layer defines an access port, (ii) a cross-section of the access port is defined by an area of intersection of the access port and the chamber, (iii) a surface area of the chamber is the sum of a surface area of the recess and an area of a portion of the bottom surface of the layer disposed over the recess minus an area of the cross-section of the access port, and (iv) the area of the cross-section of the access port is smaller than the surface area of the chamber.

4. The structure of claim 1, wherein the chamber comprises a low-index material.

5. The structure of claim 1, wherein the chamber is sized to contain a remaining portion of the first guided mode.

6. The structure of claim 1, further comprising
   an optical ring resonator;
   wherein the optical ring resonator comprises the first optical waveguide.

7. The structure of claim 1, wherein the first guided mode comprises an associated operating wavelength range having a center free-space wavelength, and each cross-sectional dimension of said first optical waveguide is smaller than the center free-space wavelength.

8. The structure of claim 1, further comprising:
   a second optical waveguide having a second core including a second core material and a second guided mode, the second guided mode having an associated second field evanescent decay length,
   wherein (i) a bottom portion of the second optical waveguide is disposed at a second distance from the bottom surface of the layer, the second distance being smaller than 5 second evanescent decay lengths, and (ii) the first and second optical waveguides are optically coupled.

9. The structure of claim 1, wherein the first and second cladding material are the same material.

10. A structure comprising:
    a substrate having a trench defined in a backside thereof, the trench having a cross-section defined by (i) a trench width defined by a distance between two opposing sidewall portions of the trench, and (ii) a trench height equal to at least 5 times the trench width;
    a first optical waveguide disposed over a top surface of the substrate and having (i) a first core comprising a first core material, and (ii) a first guided mode;
    a first cladding material in contact with the first core; and
    a second cladding material in contact with the substrate,
    wherein (i) the first core and at least one of the first and second cladding materials have an index contrast of greater than 10%, and (ii) a majority of the first guided mode is contained in the first core and in at least one of the first cladding material and the second cladding material.

11. The structure of claim 10, wherein (i) the first guided mode has an associated field evanescent decay length, and (ii) the trench is disposed at a distance of less than 5 evanescent decay lengths from a bottom portion of the first core.

12. A method for forming a structure, the method comprising:
    defining an optical waveguide in a layer disposed over a substrate, the optical waveguide having a core material and a guided mode having an evanescent decay length;
    defining an access port through the layer; and
    locally removing with a dry etch a portion of the substrate directly underneath the optical waveguide to form a recess in the substrate, wherein all portions of the substrate disposed within about 5 evanescent decay lengths from the optical waveguide are removed.

13. The method of claim 12, wherein (i) the layer comprises a first cladding material and a second cladding material, (ii) the first core material and at least one of the first and second cladding materials have an index contrast of greater than 10%, and (iii) a majority of the first guided mode is contained in the first core material and in at least one of the first cladding material and the second cladding material.

14. The method of claim 12, wherein the substrate comprises at least one of a group IV element or compound, a III-V compound, or a II-VI compound.

15. The method of claim 12, wherein defining said access port comprises reactive ion etching.

16. The method of claim 12, wherein defining said access port comprises performing a wet chemical etch.

17. The method of claim 12, further comprising filling the access port with $SiO_2$ after the formation of the recess.

18. The method of claim 12, wherein (i) the layer is formed after the optical waveguide is defined, (ii) the layer comprises an overcladding layer including a first cladding layer and a second cladding layer, and (iii) the access port is formed through the overcladding layer proximate, and not directly over, the optical waveguide.

19. The method of claim 12, wherein defining the optical waveguide comprises the steps of:
providing a core material layer over the substrate,
patterning the core material layer to define at least a portion of the optical waveguide, and
depositing an overcladding layer over the optical waveguide.

20. A method for forming a structure, the method comprising:
defining an optical waveguide in a layer disposed over a substrate, the optical waveguide having a core material and a guided mode;
defining an access port through the layer; and
locally removing with a dry etch a portion of the substrate directly underneath the optical waveguide to form a recess in the substrate,
wherein the dry etch comprises a non-plasma-based etch.

21. The method of claim 20, wherein the non-plasma-based etch includes etching with an etchant comprising $XeF_2$.

* * * * *